US012476039B2

(12) United States Patent
Atomura et al.

(10) Patent No.: US 12,476,039 B2
(45) Date of Patent: Nov. 18, 2025

(54) COIL COMPONENT, CIRCUIT BOARD, AND ELECTRONIC DEVICE

(71) Applicant: TAIYO YUDEN CO., LTD., Tokyo (JP)

(72) Inventors: Kenji Atomura, Tokyo (JP); Tomoo Kashiwa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 910 days.

(21) Appl. No.: 17/703,658

(22) Filed: Mar. 24, 2022

(65) Prior Publication Data

US 2022/0319765 A1 Oct. 6, 2022

(30) Foreign Application Priority Data

Mar. 30, 2021 (JP) ................................ 2021-058323

(51) Int. Cl.
*H01F 5/00* (2006.01)
*H01F 27/24* (2006.01)
*H01F 27/29* (2006.01)
*H01F 27/32* (2006.01)

(52) U.S. Cl.
CPC ............ *H01F 27/29* (2013.01); *H01F 27/24* (2013.01); *H01F 27/32* (2013.01)

(58) Field of Classification Search
CPC .................................................. H01F 27/2823
USPC .......................................................... 336/200
See application file for complete search history.

(56) References Cited

U.S. PATENT DOCUMENTS 10,861,633 B2 * 12/2020 Kim .................... H01F 17/0013
2006/0001520 A1 * 1/2006 Kaji ...................... H01F 41/041 257/E21.022
2012/0274433 A1 * 11/2012 Matsumoto ........... H01F 27/292 336/192
2015/0170823 A1 * 6/2015 Jeong .................... C25D 7/001 336/200
2018/0308610 A1 * 10/2018 Ishida .................. H01F 27/292

FOREIGN PATENT DOCUMENTS

JP 2014-175437 A 9/2014

* cited by examiner

*Primary Examiner* — Ronald Hinson
(74) *Attorney, Agent, or Firm* — Pillsbury Winthrop Shaw Pittman, LLP

(57) ABSTRACT

A coil component includes a coil part. The coil part includes a first turn part extending around a coil axis running in an axial direction, a second turn part outside the first turn part in a radial direction orthogonal to the axial direction and centered on the coil axis, and an insulating coating film covering a surface of the coil part. The first turn part has first inner and outer peripheral surfaces facing each other, and the first outer peripheral surface is depressed inwardly in the radial direction when seen in a section of the coil component along a plane passing through the coil axis, and the second turn part has second inner and outer peripheral surfaces facing each other, and the second inner peripheral surface faces the first outer peripheral surface and protrudes inwardly in the radial direction when seen in the section.

19 Claims, 13 Drawing Sheets

COIL COMPONENT, CIRCUIT BOARD, AND ELECTRONIC DEVICE

CROSS-REFERENCE TO RELATED APPLICATIONS

This application is based on and claims the benefit of priority from Japanese Patent Application Serial No. 2021-058323 (filed on Mar. 30, 2021), the contents of which are hereby incorporated by reference in its entirety.

TECHNICAL FIELD

The present disclosure relates to a coil component, a circuit board, and an electronic device.

BACKGROUND

Known coil components include a coil part formed by winding a conductive strip member covered with an insulating coating film. For example, the coil part disclosed in Japanese Patent Application Publication No. 2014-175437 includes a coil part having a winding part formed by winding, around a coil axis and a plurality of turns, an elongated conductive strip member having a rectangular sectional shape. In order to prevent the wound strip member from loosening, the turns making up the coil part are preferably aligned with each other on a plane orthogonal to the coil axis (hereinafter, this plane is referred to as the "winding plane").

The coil part is made from a flat wire having a rectangular section, which is widely used. As the winding part of the coil part is formed by winding a flat wire, the turns making up the winding part are arranged such that their flat surfaces face each other. Accordingly, some of the turns tend to move out of the aligned position on the winding plane in an axial direction extending along the coil axis. For example, during the process of manufacturing the coil component, the stress applied to the coil part is released, after which spring back effect may take place. The spring-back tends to move the component parts of the coil part out of the aligned position on the winding plane. In addition, if residual stress remains in the coil part, or if stress acts on the coil part in the finished coil component, some of the turns constituting the winding part may move in the axial direction out of the aligned position on the winding plane in the manufactured coil component.

SUMMARY

An object of the present invention is to solve or relieve at least a part of the above problem. More specifically, one of the objectives of the present invention is to provide a coil component having a coil part including a winding part made up by a plurality of turns, which are prevented from moving out of the aligned position on the winding plane.

The other objects of the disclosure will be apparent with reference to the entire description in this specification. The invention disclosed herein may solve any other drawbacks grasped from the following description, instead of or in addition to the above drawback.

A coil component according to one aspect of the invention includes a magnetic base body and a coil part provided in or on the magnetic base body. The coil part may include (i) a first turn part extending around a coil axis that runs in an axial direction, and (ii) a second turn part positioned outside the first turn part in a radial direction that is orthogonal to the axial direction and is centered on the coil axis. The coil part may include an insulating coating film covering a surface of the coil part. The first turn part may have a first inner peripheral surface, and a first outer peripheral surface facing the first inner peripheral surface and depressed inwardly in the radial direction when seen in a section of the coil component obtained by cutting the coil component along a plane passing through the coil axis, and the second turn part may have a second inner peripheral surface facing the first outer peripheral surface and protruding inwardly in the radial direction when seen in the section, and a second outer peripheral surface facing the second inner peripheral surface.

In one aspect of the present invention, the first inner peripheral surface may protrude inwardly in the radial direction.

In one aspect of the present invention, the second outer peripheral surface may be depressed inwardly in the radial direction.

In one aspect of the present invention, a depth of the first outer peripheral surface that represents a distance in the radial direction between (i) a first-outer-peripheral-surface closest portion of the first outer peripheral surface that is the closest to the coil axis and (ii) a first-outer-peripheral-surface most distant portion of the first outer peripheral surface that is the most distant from the coil axis may be greater than a thickness of the insulating coating film.

In one aspect of the present invention, a second-inner-peripheral-surface closest portion of the second inner peripheral surface that is the closest to the coil axis may be located closer to the coil axis in the radial direction than is the first-outer-peripheral-surface most distant portion.

In one aspect of the present invention, a depth of the second outer peripheral surface that represents a distance in the radial direction between (i) a second-outer-peripheral-surface closest portion of the second outer peripheral surface that is the closest to the coil axis and (ii) a second-outer-peripheral-surface most distant portion of the second outer peripheral surface that is the most distant from the coil axis may be greater than the thickness of the insulating coating film.

In one aspect of the present invention, the coil component may include a first external electrode connected to one of ends of the coil part, and a second external electrode connected to the other of the ends of the coil part.

In one aspect of the present invention, the coil part may include a first winding part including the first and second turn parts, a second winding part differently positioned in the axial direction than the first winding part, and a connecting part connecting together the first and second winding parts.

In one aspect of the present invention, the second winding part may include a third turn part and a fourth turn part positioned outside the third turn part in the radial direction. In one aspect of the present invention, the third turn part may have a third inner peripheral surface, and a third outer peripheral surface facing the third inner peripheral surface and depressed inwardly in the radial direction when seen in the section. In one aspect of the present invention, the fourth turn part may have a fourth inner peripheral surface facing the third outer peripheral surface and protruding inwardly in the radial direction when seen in the section, and a fourth outer peripheral surface facing the fourth inner peripheral surface.

In one aspect of the present invention, the third inner peripheral surface may protrude inwardly in the radial direction.

In one aspect of the present invention, the fourth outer peripheral surface may be depressed inwardly in the radial direction.

In one aspect of the present invention, a depth of the third outer peripheral surface that represents a distance in the radial direction between (i) a third-outer-peripheral-surface closest portion of the third outer peripheral surface that is the closest to the coil axis and (ii) a third-outer-peripheral-surface most distant portion of the third outer peripheral surface that is the most distant from the coil axis may be greater than a thickness of the insulating coating film.

In one aspect of the present invention, the first turn part may have a curved first connecting surface connecting together the first inner and outer peripheral surfaces, the second turn part may have a curved second connecting surface connecting together the second inner and outer peripheral surfaces, the third turn part may have a curved third connecting surface facing the first connecting surface and connecting together the third inner and outer peripheral surfaces, and the fourth turn part may have a curved fourth connecting surface facing the second connecting surface and connecting together the fourth inner and outer peripheral surfaces.

In one aspect of the present invention, a normal at a center in the axial direction of the first inner peripheral surface and a normal at a center in the axial direction of the third inner peripheral surface may be both parallel to the coil axis.

In one aspect of the present invention, a first angle made between the coil axis and a line segment extending along a normal at a center in the axial direction of the first inner peripheral surface from the first inner peripheral surface to the coil axis may be different from a second angle made between the coil axis and a line segment extending along a normal at a center in the axial direction of the third inner peripheral surface from the third inner peripheral surface to the coil axis.

In one aspect of the present invention, a first angle made between the coil axis and a line segment extending along a normal at a center in the axial direction of the first inner peripheral surface from the first inner peripheral surface to the coil axis may be equal to a second angle made between the coil axis and a line segment extending along a normal at a center in the axial direction of the third inner peripheral surface from the third inner peripheral surface to the coil axis.

In one aspect of the invention, a first aspect ratio representing a ratio of a dimension of the first turn part in the axial direction to a dimension of the first turn part in the radial direction may be in a range of 0.5 to 2.0, when seen in the section, a second aspect ratio representing a ratio of a dimension of the second turn part in the axial direction to a dimension of the second turn part in the radial direction may be in a range of 0.5 to 2.0, when seen in the section, a third aspect ratio representing a ratio of a dimension of the third turn part in the axial direction to a dimension of the third turn part in the radial direction may be in a range of 0.5 to 2.0, and when seen in the section, a fourth aspect ratio representing a ratio of a dimension of the fourth turn part in the axial direction to a dimension of the fourth turn part in the radial direction may be in a range of 0.5 to 2.0.

A circuit board according to one aspect of the present invention includes one of the above coil components.

An electronic device relating to one embodiment of the present invention includes the above-described circuit board.

Advantageous Effects

At least one of the embodiments of the present invention can provide a coil component having a coil part including a winding part made up by a plurality of turns, which are prevented from moving out of an aligned position on a winding plane.

DESCRIPTION OF THE PREFERRED EMBODIMENTS

The following describes various embodiments of the present invention by referring to the appended drawings as appropriate. The constituents common to more than one drawing are denoted by the same reference signs throughout the drawings. It should be noted that the drawings are not necessarily drawn to an accurate scale for the sake of convenience of explanation. The following embodiments of the present invention do not limit the scope of the claims. The elements described in the following embodiments are not necessarily essential to solve the problem to be solved by the invention.

Figure 1:
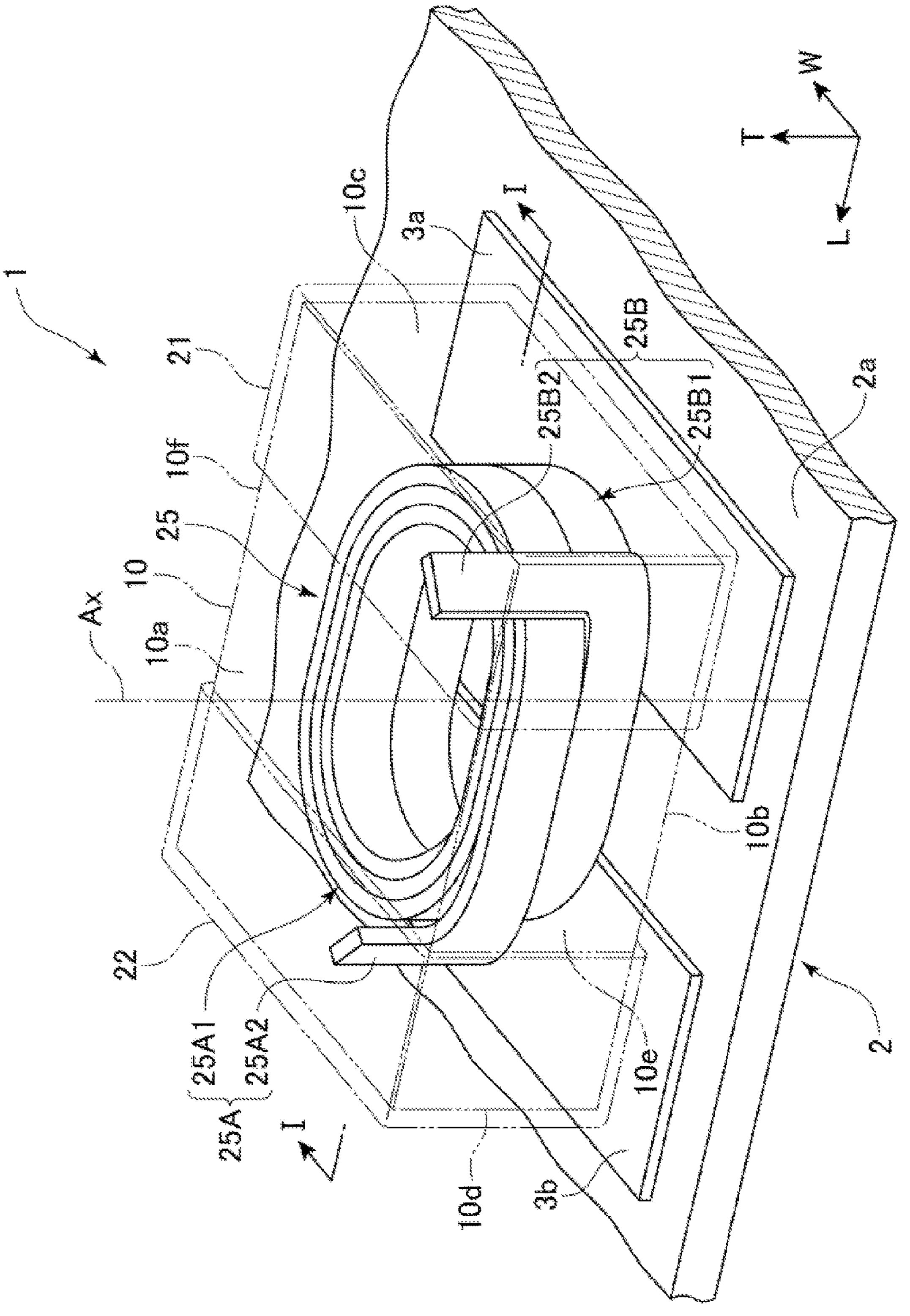
FIG. 1 is a perspective view schematically showing a coil component according to one embodiment of the invention.

A coil component 1 according to one embodiment of the present invention will be hereinafter outlined with reference to FIG. 1. FIG. 1 is a perspective view schematically showing the coil component 1. As shown in FIG. 1, the coil component 1 includes a base body 10 exhibiting insulation property, a coil part 25 provided in or on the base body 10, an external electrode 21 disposed on a surface of the base body 10, and an external electrode 22 disposed on the surface of the base body 10 at a position spaced apart from the external electrode 21. In the embodiment illustrated, the coil part 25 is enclosed within the base body 10. The coil part 25 may be provided on the surface of the base body 10. For the sake of convenience, FIG. 1 shows the coil part 25 through the base body 10 and the external electrodes 21 and 22.

Herein, the positions, dimensions, shapes and other features of the constituent members may be described based on "the L axis," "the W axis," and "the T axis" shown in the drawings. In this specification, the "length" direction, the "width" direction, and the "thickness" direction of the coil component 1 refer to the "L-axis" direction, the "W-axis" direction, and the "T-axis" direction in FIG. 1, respectively. The "thickness" direction is also referred to as the "height" direction. The L, W and T axes are orthogonal to one another.

The coil component 1 may be mounted on a mounting substrate 2*a*. The mounting substrate 2*a* has lands 3*a* and 3*b* provided thereon. The coil component 1 is mounted on the mounting substrate 2*a* by bonding the external electrode 21 to the land 3*a* and bonding the external electrode 22 to the land 3*b*. A circuit board 2 relating to one embodiment of the present invention includes the coil component 1 and the mounting substrate 2*a* having the coil component 1 mounted thereon. The circuit board 2 can be installed in various electronic devices. The electronic devices in which the circuit board 2 may be installed include smartphones, tablets, game consoles, electrical components of automobiles, servers and various other electronic devices. For the sake of intelligibility, the drawings other than FIG. 1 do not show the mounting substrate 2*a* and the lands 3*a* and 3*b*.

The coil component 1 may be applied to inductors, transformers, filters, reactors, and various other coil components having the external electrodes 21, 22 on the surface of the base body 10. The coil component 1 may also be applied to coupled inductors, choke coils, and various other magnetically coupled coil components. Applications of the coil component 1 are not limited to those explicitly described herein.

The base body 10 is made of a magnetic material and formed in a rectangular parallelepiped shape as a whole. In one embodiment of the present invention, the base body 10 is sized such that its dimension in the L-axis direction (the length) is greater than its dimension in the W-axis direction (the width) and its dimension in the T-axis direction (the height). For example, the length is within the range of 1.0 mm to 6.0 mm, the width is within the range of 0.5 mm to 4.5 mm, and the height is within the range of 0.5 mm to 4.5 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense. The dimensions and shape of the base body 10 are not limited to those specified herein.

The base body 10 has a first principal surface 10*a*, a second principal surface 10*b*, a first end surface 10*c*, a second end surface 10*d*, a first side surface 10*e*, and a second side surface 10*f*. These six surfaces define the outer surface of the base body 10. The first principal surface 10*a* and the second principal surface 10*b* are at the opposite ends of the base body 10 in the height direction, the first end surface 10*c* and the second end surface 10*d* are at the opposite ends of the base body 10 in the width direction, and the first side surface 10*e* and the second side surface 10*f* are at the opposite ends of the base body 10 in the length direction. The top surface 10*a* and the bottom surface 10*b* are separated from each other by a distance equal to the height of the base body 10, the first end surface 10*c* and the second end surface 10*d* are separated from each other by a distance equal to the width of the base body 10, and the first side surface 10*e* and the second side surface 10*f* are separated from each other by a distance equal to the length of the base body 10. As shown in FIG. 1, the first principal surface 10*a* lies on the top side of the base body 10, and therefore, the first principal surface 10*a* may be herein referred to as "the top surface." For a similar reason, the second principal surface 10*b* may be referred to as "the bottom surface." The coil component 1 is disposed such that the second principal surface 10*b* faces the mounting substrate 2*a*, and therefore, the second principal surface 10*b* may be herein referred to as "the mounting surface."

In the illustrated embodiment, the surfaces 10*a* to 10*f* of the base body 10 are shown as flat surfaces, but may alternatively be curved surfaces. In addition, although the surfaces 10*a* to 10*f* are each shown as orthogonal to adjacent ones of the surfaces, the surfaces 10*a* to 10*f* may not be orthogonal to their adjacent surfaces. The vertices of the base body 10 may be rounded, and the ridge lines of the base body 10 (the lines marking the boundaries between adjacent ones of the surfaces 10*a* to 10*f*) may not be straight, but may be curved depending on the shapes and positions of the surfaces 10*a* to 10*f*.

In one embodiment of the present invention, the base body 10 is formed of a magnetic material. The magnetic material used for the base body 10 may be, for example, ferrites, soft magnetic alloy materials, or magnetic mixture materials obtained by mixing these. The ferrites used for the base body 10 include a Ni—Cu—Zn-based ferrite, a Ni—Cu—Zn—Mg-based ferrite, a Cu—Zn-based ferrite, an Ni—Cu-based ferrite, or any other known ferrites. The soft magnetic metal materials used for the base body 10 are, for example, (1) metals such as Fe or Ni; (2) alloys such as Fe—Si—Cr, Fe—Si—Al, or Fe—Ni; (3) amorphous materials Fe—Si—Cr—B—C or Fe—Si—B—Cr; or (4) a mixture material of thereof. The base body 10 may be constituted by a plurality of metal magnetic particles of a soft magnetic metal material. In one embodiment, the magnetic material for the base body 10 has a relative magnetic permeability of 100 or less. For example, the magnetic material used for the base body 10 can be a soft magnetic metal material having a relative magnetic permeability of 100 or less. The metal magnetic particles contained in the base body 10 may bind to their adjacent metal magnetic particles via an insulating film. The insulating film may contain oxides of the constituent elements of the metal magnetic particles, or may be formed of an insulating material other than the constituent elements of the metal magnetic particles. The base body 10 may contain a resin. For example, the base body 10 may contain a resin binder binding together the metal magnetic particles of a soft magnetic metal material. The binder is, for example, a highly insulating thermosetting resin. The binder is made of a resin material having lower permeability than the soft magnetic metal material. Examples of the resin material of the binder include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PB 0) resin.

Figure 2:
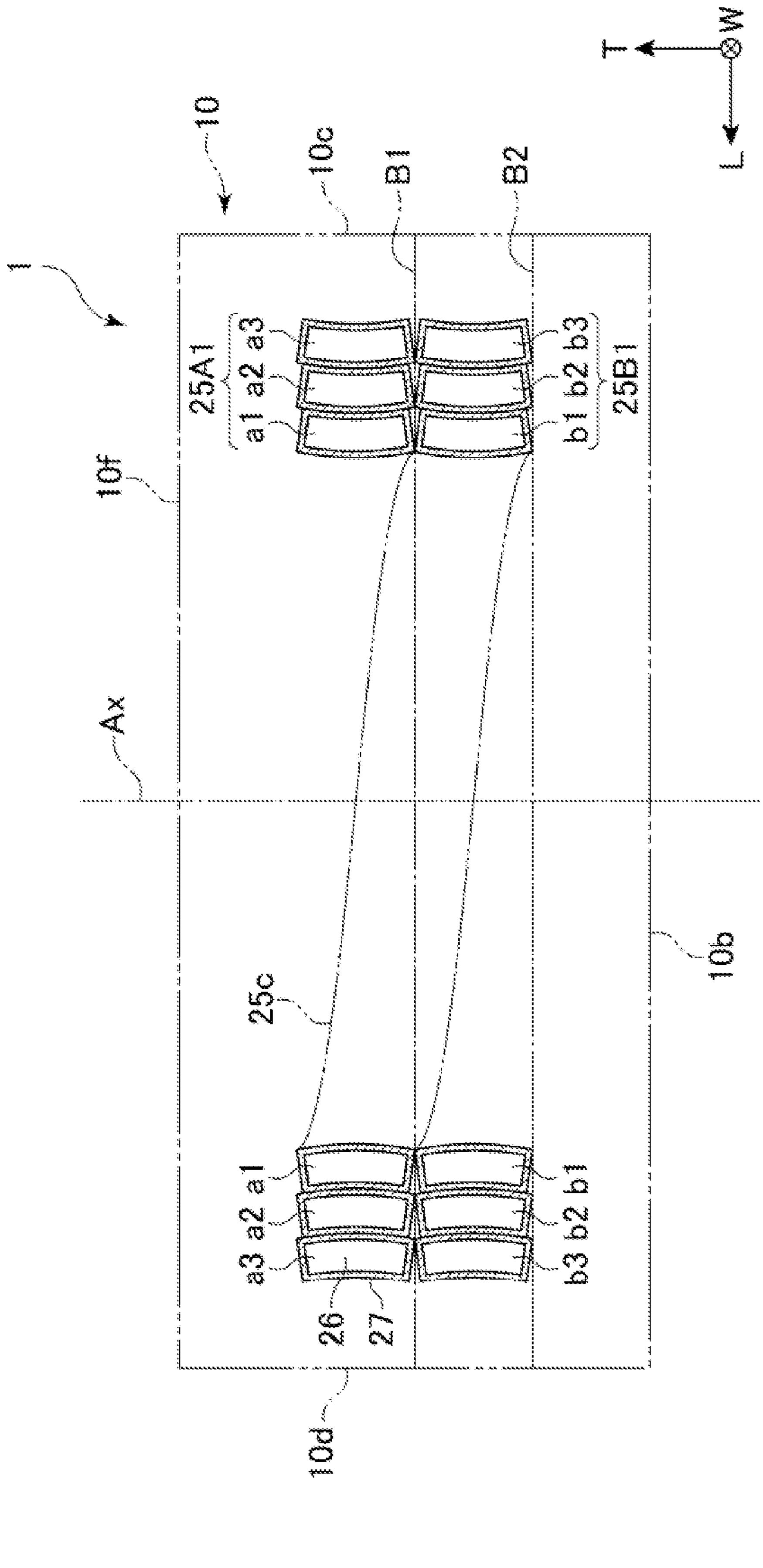
FIG. 2 is a schematic sectional view of the coil component of FIG. 1 along the line I-I.
Figure 3:
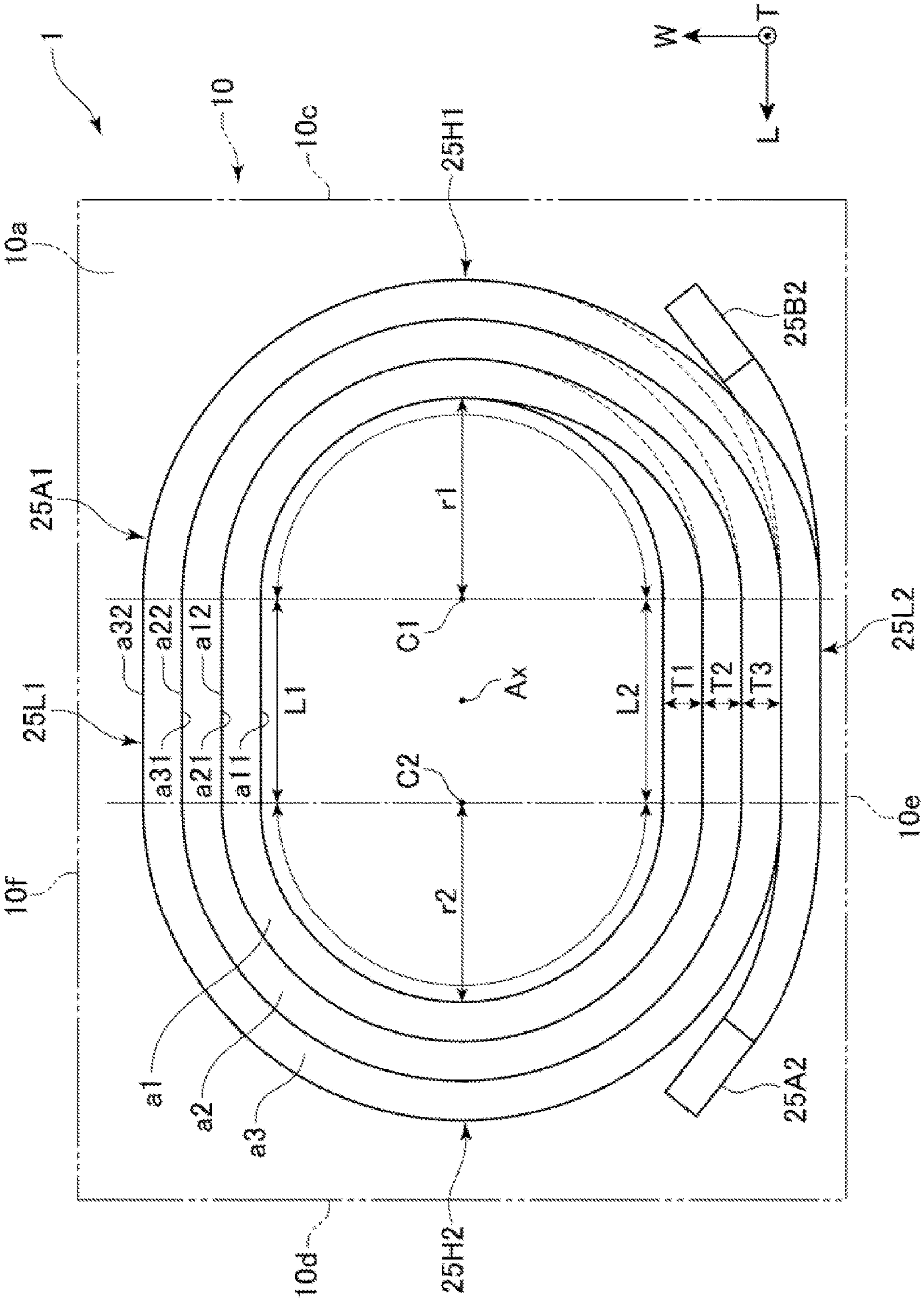
FIG. 3 is a schematic plan view of the coil component shown in FIG. 1.

Next, with reference to FIGS. 2 and 3, a further description is given of the coil part 25. FIG. 2 schematically shows a section of the coil component 1 along the line I-I in FIG. 1, and FIG. 3 is a plan view of the coil component 1. For the sake of convenience, the external electrodes 21 and 22 are not shown in FIGS. 2 and 3.

In at least one of the embodiments of the present invention, at least part of the coil part 25 is wound in a whirling pattern on a plane intersecting (for example, orthogonal to) the coil axis Ax. The portion of the coil part 25 that extends along the plane intersecting the coil axis Ax swirls from the inside to the outside in the radial direction originating from the coil axis Ax. In the embodiment illustrated, the coil part 25 spirally extends around the coil axis Ax and is enclosed within the base body 10. The coil axis Ax is positioned such that it intersects the top and bottom surfaces 10*a* and 10*b*. The coil axis Ax can be, for example, an axis extending along a straight line passing through the geometric center of gravity of the top surface 10*a* when the coil component 1 is viewed in the T-axis direction and the geometric center of gravity of the bottom surface 10*b* when the coil component 1 is similarly viewed in the T-axis direction. As used herein, the terms "axial direction" and "radial direction" may respectively denote the direction extending along the coil axis Ax and the direction extending orthogonally to the axial direction and originating from the coil axis Ax.

In the embodiment shown, the coil part 25 has a two-layer structure with an upper coil part 25A as the upper layer and a lower coil part 25B as the lower layer. The upper coil part 25A has a first winding part 25A1 wound around the coil axis Ax more than one turn, and a lead-out part 25A2 connected to one of the ends of the first winding part 25A1 and extending along the T-axis to the top surface 10*a* of the base body 10. The lower coil part 25B has a second winding part 25B1 wound around the coil axis Ax more than one turn, and a lead-out part 25B2 connected to one of the ends of the second winding part 25B1 and extending along the T-axis to the top surface 10*a* of the base body 10. The end of the first winding part 25A1 opposite to the end connected to the lead-out part 25A2 is connected, via a connecting part 25C, to the end of the second winding part 25B1 opposite to the end connected to the lead-out part 25B2. In other words, the connecting part 25C connects together one end of the first winding part 25A1 and one end of the second winding part 25B1. As shown in FIG. 2, the connecting part 25C extends from the inner end of the first winding part 25A1 to the inner end of the second winding part 25B1 along a direction at an angle relative to the coil axis Ax.

The upper end of the lead-out part 25A2 and the upper end of the lead-out part 25B2 are exposed outside the base body 10 through the top surface 10*a*. The lead-out part 25A2 is connected to the external electrode 22 at the end surface thereof exposed through the top surface 10*a*, and the lead-out part 25B2 is connected to the external electrode 21 at the end surface thereof exposed through the top surface 10*a*.

The coil part 25 includes a conductor part 26 made of a highly conductive material such as Cu, Ag and Au and shaped like a strip, and an insulating coating film 27 covering the surface of the conductor part 26. The insulating coating film 27 covers the surface of the conductor part 26 except for the end surface of the lead-out part 25A2 exposed through the top surface 10*a* and the end surface of the lead-out part 25B2 exposed through the top surface 10*a*. The insulating coating film 27 is, for example, made of a highly insulating thermosetting resin. More specifically, the insulating coating film 27 may be composed of a highly insulating resin such as polyurethane, polyamide-imide, polyimide, polyester, polyester-imide and the like.

The coil part 25 may have a single-layer structure. When the coil part 25 has a single-layer structure, the coil part 25 may not have the lower coil part 25B. When the coil part 25 has a single-layer structure, the coil part 25 only has the upper coil part 25A, one of the ends of the first winding part 25A1 of the upper coil part 25A is connected to the external electrode 22 via the lead-out part 25A2, and the other end is connected to the external electrode 21 via a different lead-out part than the lead-out part 25A2. A coil conductor with a coil part having a single-layer structure will be discussed below.

As shown in FIGS. 2 and 3, the first and second winding parts 25A1 and 25B1 are each wound around the coil axis Ax approximately three turns. Accordingly, in the section shown in FIG. 2, the first and second winding parts 25A1 and 25B1 each have winding elements corresponding to about three turns. More specifically, the first winding part 25A1 has a first turn part a1, a second turn part a2, and a third turn part a3, and the second winding part 25B1 has a first turn part b1, a second turn part b2, and a third turn part b3. The first, second and third turn parts a1, a2, and a3 are arranged in this order in the radial direction from the inside to the outside. Similarly, the first, second, and third turn parts b1, b2, and b3 are arranged in this order in the radial direction from the inside to the outside. In the axial direction, the first turn part a1 of the first winding part 25A1 is opposite the first turn part b1 of the second winding part 25B1. Similarly, the second turn part a2 of the first winding part 25A1 is opposite the second turn part b2 of the second winding part 25B1 in the axial direction, and the third turn part a3 of the first winding part 25A1 is opposite the third turn part b3 of the second winding part 25B1 in the axial direction. The first to third turn parts a1 to a3 are each in contact with radially adjacent ones of the turn parts via the insulating coating film 27, and the first to third turn parts b1 to b3 are each in contact with radially adjacent ones of the turn parts via the insulating coating film 27. In addition to the first to third turn parts a1 to a3, a turn part may be provided radially inside the first turn part a1 and makes up the first winding part 25A1. In addition to the first to third turn parts a1 to a3, a turn part may be provided radially outside the third turn part a3 and makes up the first winding part 25A1. In addition to the first to third turn parts b1 to b3, a turn part may be provided radially inside the first turn part b1 and makes up the second winding part 25B1. In addition to the first to third turn parts b1 to b3, a turn part may be provided radially outside the third turn part b3 and makes up the second winding part 25B1.

FIG. 2 shows a winding plane B1 orthogonal to the coil axis Ax and touching the lower edge of the first turn part a1 and a winding plane B2 orthogonal to the coil axis Ax and touching the lower edge of the first turn part b1. The winding plane B1 is an imaginary plane indicating an aligned position where the first, second, and third turn parts a1, a2, and a3 are aligned with each other. The winding plane B2 is an imaginary plane indicating an aligned position where the first, second, and third turn parts b1, b2, and b3 are aligned with each other. The coil part 25 includes the first, second and third turn parts a1, a2 and a3 aligned with each other on the winding plane B1. In other words, the lower edges of the first, second and third turn parts a1, a2 and a3, which makes up the first winding part 25A1, touch the winding plane B1. Similarly, the coil part 25 includes the first, second and third turn parts b1, b2 and b3 aligned with each other on the winding plane B2. In other words, the lower edges of the first, second and third turn parts b1, b2 and b3, which make up the second winding part 25B1, touch the winding plane B2.

The first, second and third turn parts a1, a2 and a3 each extend to form one turn (360°) in the circumferential direction around the coil axis Ax. More specifically, the first turn part a1 is connected to the connecting part 25C at one end thereof, and extends 360° in the circumferential direction from the position where it is connected to the connecting part 25C. The first turn part a1 is connected at the other end thereof to one end of the second turn part a2, and the second turn part a2 extends 360° in the circumferential direction from the position it is connected to the first turn part a1. The second turn part a2 is connected at the other end thereof to one end of the third turn part a3, and the third turn part a3 extends 360° in the circumferential direction from the position where it is connected to the second turn part a2. The third turn part a3 is connected at the other end thereof to one end of the lead-out part 25A2. In order to adaptively position the lead-out part 25A2, the third turn part a3 may extend in the circumferential direction less than one turn)(360° (e.g., a length equivalent to about 0.8 turns) or more than one turn)(360° (e.g., a length equivalent to about 1.2 turns).

The foregoing description about the first, second and third turn parts a1, a2 and a3 also applies to the first, second and third turn parts b1, b2 and b3. To be more specific, the first, second, and third turn parts b1, b2, and b3 each extend to form one turn (360°) in the circumferential direction around the coil axis Ax. More specifically, the first turn part b1 is connected to the connecting part 25C at one end thereof and extends 360° in the circumferential direction from the position where it is connected to the connecting part 25C. In the circumferential direction, the first turn part b1 extends from the position where it is connected to the connecting part 25C in the direction opposite to the direction in which the first turn part a1 extends. For example, if the first turn part a1 extends one turn from the position where it is connected to the connecting part 25C clockwise in the circumferential direction, the first turn part b1 extends one turn counterclockwise from the position where it is connected to the connecting part 25C. The first turn part b1 is connected at the other end thereof to one end of the second turn part b2, and the second turn part b2 extends 360° in the circumferential direction from the position where it is connected to the first turn part b1. The second turn part b2 is connected at the other end thereof to one end of the third turn part b3, and the third turn part b3 extends 360° in the circumferential direction from the position where it is connected to the second turn part b2. The third turn part b3 is connected at the other end thereof to one end of the lead-out part 25B2. In order to adaptively position the lead-out part 25B2, the third turn part b3 may extend in the circumferential direction less than one turn (360°) or more than one turn (360°).

As shown in FIG. 3, the first winding part 25A1 may have an elliptic shape in plan view, which is divided into a straight part and an arc-shaped part. In the embodiment shown, the first winding part 25A1 has, in plan view, a first straight part 25L1 extending linearly along the L-axis direction and having a length L1, a second straight part 25L2 extending parallel to the first straight part 25L1, having a length L2 and located on the negative side of the first straight part 25L1 in the W-axis direction, a first half circular part 25H1 connecting together the negative-side end in the L-axis direction of the first straight part 25L1 and the negative-side end in the L-axis direction of the second straight part 25L2 and extending 180° around a center C1, and a second half circular portion 25H2 connecting together the positive-side end in the L-axis direction of the first straight part 25L1 and the positive-side end in the L-axis direction of the second straight part 25L2 and extending 180° around a center C2. As shown in FIG. 3, as for the first winding part 25A1, T1 denotes the thickness of the first turn part a1 in the radial direction, T2 denotes the thickness of the second turn part a2 in the radial direction, and T3 denotes the thickness of the third turn part a3 in the radial direction. The thicknesses T1 to T3 can be equal to each other. As will be described below, since the coil part 25 is made by winding a strip member having a constant thickness around a winding core or core, the thicknesses T1 to T3 may be approximately equal to each other. The thickness T1 of the first turn part a1 indicates the dimension of the first turn part a1 in the radial direction when the coil part 25 is exposed through the base body 10 of the coil component 1 and the coil part 25 is viewed in the T-axis direction. The thicknesses T2 and T3 can be defined in the same way. The inner peripheral surface of the first half circular part 25H1 extends along the circumference of a circle having a radius r1 and centered on the center C1, and the inner peripheral surface of the second half circular part 25H2 extends along the circumference of a circle having a radius r2 and centered on the center C2. The length L1 may be equal to the length L2. The radii r1 and r2 may be equal to each other.

In one embodiment of the present invention, the ratio of the radius r1 to the thickness T1 (i.e., the ratio r1/T1, hereinafter referred to as "the radius-to-thickness ratio") is set to be within the range of 1 to 3. If the radius-to-thickness ratio is less than 1, the insulating coating film 27 on the surface of the coil part 25 is more likely to peel off. Accordingly, the lower limit of the radius-to-thickness ratio is 1. On the other hand, the radius-to-thickness ratio is desirably equal to or less than 3 in order to allow the inner peripheral surface a11 of the first turn part a1 and the inner peripheral surface of the other turn parts to protrude inwardly in the radial direction and allow the outer peripheral surface a12 of the first turn part a1 and the outer peripheral surface of the other turn parts to be depressed inwardly in the radial direction, as will be described below. For the reasons stated above, in one embodiment of the invention, the radius-to-thickness ratio is within the range of 1 to 3.

In one embodiment of the present invention, the first winding part 25A1 is sized such that the sum of the length of the inner peripheral surface of the first half circular part 25H1 around the center C1 (i.e., π·r1) and the length of the inner peripheral surface of the second half circular part 25H2 around the center C2 (i.e., n r2) is 1.5 times or more as large as the sum of the length L1 in the L-axis direction of the first straight part 25L1 and the length L2 in the L-axis direction of the second straight part 25L2 (i.e., L1+L2). This means that the relationship $\pi \cdot r1+\pi \cdot r2 \geq 1.5 \cdot (L1+L2)$ holds. In one embodiment of the present invention, the first winding part 25A1 is sized such that the sum of the length of the inner peripheral surface of the first half circular part 25H1 around the center C1 (i.e., π·r1) and the length of the inner peripheral surface of the second half circular part 25H2 around the center C2 (i.e., π·r2) is 2.0 times or more as large as the sum of the length L1 in the L-axis direction of the first straight part 25L1 and the length L2 in the L-axis direction of the second straight part 25L2 (i.e., L1+L2). This means that the relationship $\pi \cdot r1+\pi \cdot r2 \geq 2.0 \cdot (L1+L2)$ holds. According to the method of manufacturing the coil component 1 described below, the first and second winding parts 25A1 and 25B1 are formed by winding a strip member around a winding core. In the process of forming the first and second winding parts 25A1 and 25B1, a greater force is applied in the direction toward the winding core from the winding machine to the strip member when the portions corresponding to the first and second half circular parts 25H1 and 25H2 are formed than when the portions corresponding to the first and second straight parts 25L1 and 25L2 are formed. As a larger force directed toward the winding core is applied to the strip member, the region of the inner peripheral surfaces a11 to a31 corresponding to the first and second half circular parts 25H1 and 25H2 protrude more toward the coil axis Ax than the region of the inner peripheral surfaces a11 to a31 corresponding to the first and second straight parts 25L1 and 25L2. Similarly, the region of the outer peripheral surfaces a12 to a32 corresponding to the first and second half circular parts 25H1 and 25H2 is depressed more toward the coil axis Ax than the region of the outer peripheral surfaces a12 to a32 corresponding to the first and second straight parts 25L1 and 25L2. This makes it easy for the inner peripheral surface a21 of the second turn part a2 to engage with the outer peripheral surface a12 of the first turn part a1 in the first and second half circular parts 25H1 and 25H2 and for the inner peripheral surface a31 of the third turn part a3 to engage with the outer peripheral surface a22 of the second turn part a2 in the first and second half circular parts 25H1 and 25H2. Accordingly, the turns making up the first winding part 25A1 can be reliably restricted from moving in the axial direction if the first and second half circular parts 25H1 and 25H2 are longer than the first and second straight parts 25L1 and 25L2. The same applies to the second winding part 25B1. The turns making up the second winding part 25B1 can be reliably restricted from moving in the axial direction if the first and second half circular parts 25H1 and 25H2 are longer than the first and second straight parts 25L1 and 25L2.

In one embodiment, the thickness T1 of the first turn part a1 is 0.45 mm, the radii r1 and r2 are both 0.785 mm, and the lengths L1 and L2 are both 1.60 mm.

The foregoing description on the first winding part 25A1 also applies to the second winding part 25B1 to a maximum extent. For example, the second winding part 25B1 can be also divided into parts corresponding to the first and second straight parts 25L1 and 25L2 and the first and second half circular parts 25H1 and 25H2.

Figure 4:
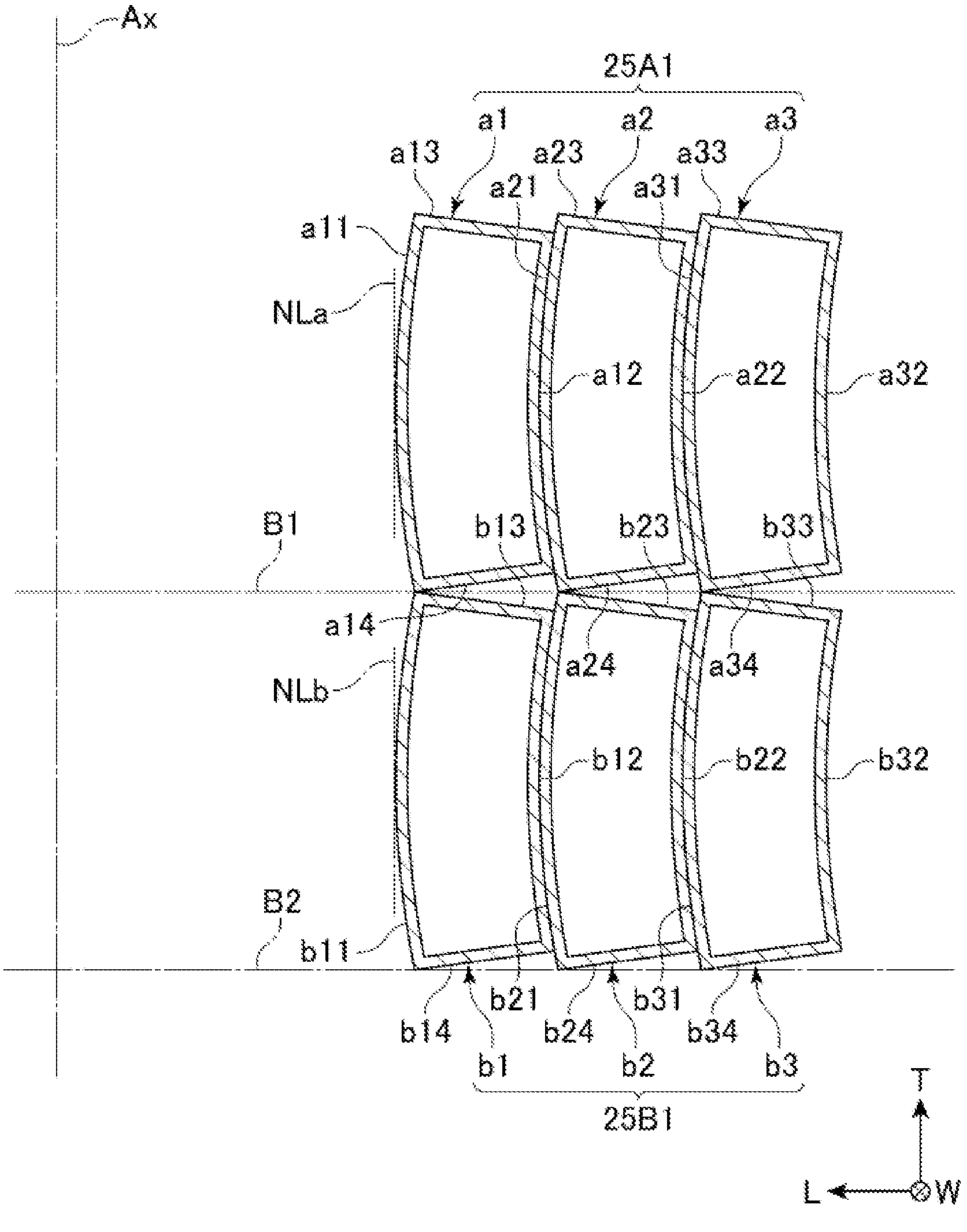
FIG. 4 is an enlarged sectional view schematically showing, on an enlarged scale, part of the coil component shown in FIG. 2.
Figure 5:
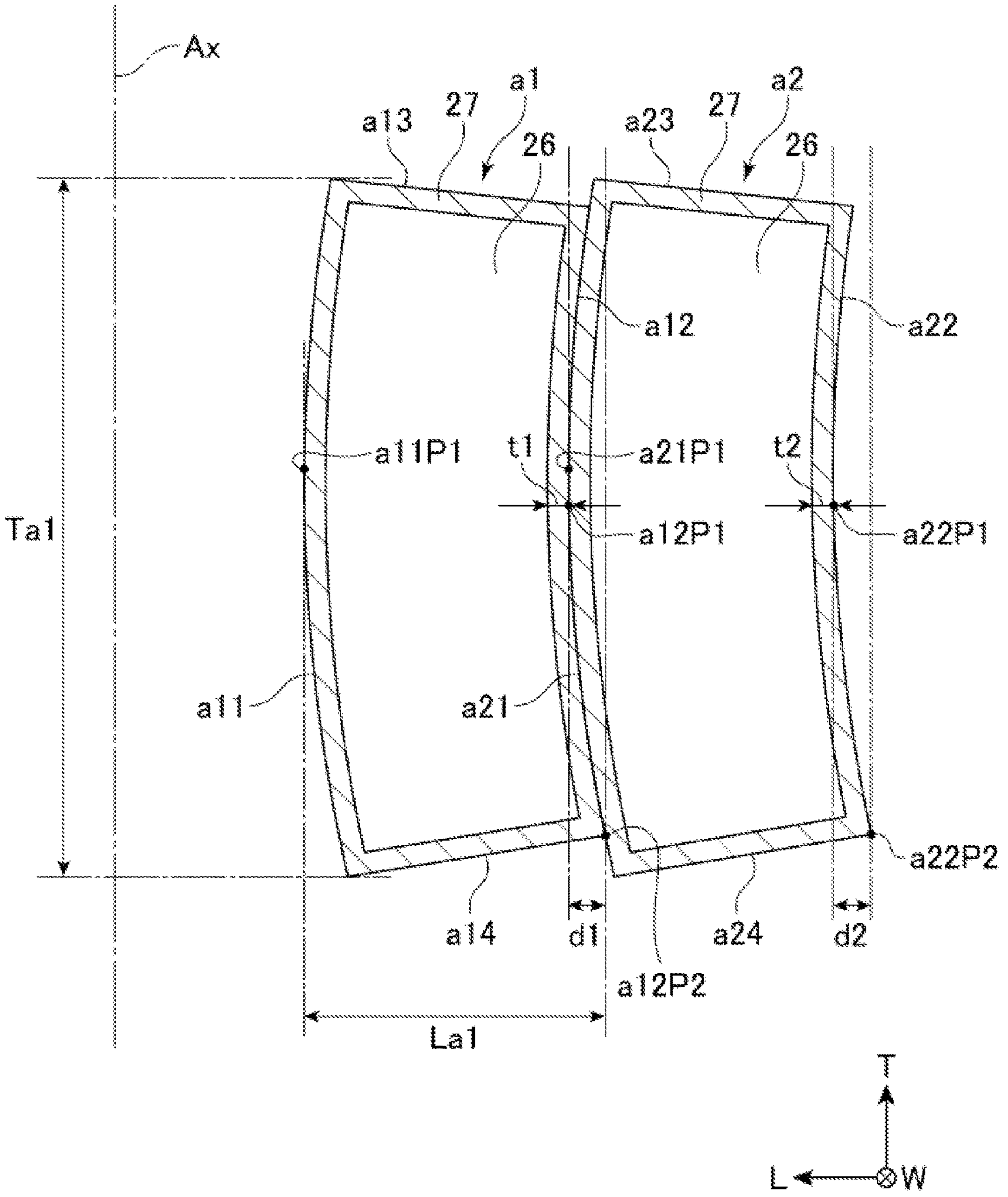
FIG. 5 is an enlarged sectional view schematically showing, on a further enlarged scale, part of the coil part shown in FIG. 4.

With further reference to FIGS. 4 and 5, the first and second winding parts 25A 1 and 25B1 will be further described. FIG. 4 is an enlarged sectional view schematically showing, on an enlarged scale, part of the coil part 25 shown in FIG. 2, and FIG. 5 is an enlarged sectional view schematically showing, on a further enlarged scale, part of the coil part 25 shown in FIG. 4. For the sake of brevity, FIG. 4 only shows portions of the first and second winding parts 25A1 and 25B1 that are on the right side on the plane of the paper (the negative side in the L-axis direction) of the coil axis Ax. As shown in FIG. 4, the first turn part a1 has, in the section obtained by cutting the coil part 25 along a plane passing through the coil axis Ax, an inner peripheral surface a11 positioned on the inner side in the radial direction, an outer peripheral surface a12 opposite the inner peripheral surface a11, an upper connecting surface a13 connecting together the inner peripheral surface a11 and the outer peripheral surface a12, and a lower connecting surface a14 opposite the upper connecting surface a13. The lower connecting surface a14 connects together the inner peripheral surface a11 and the outer peripheral surface a12 and is located below the upper connecting surface a13.

Like the first turn part a1, the other turn parts making up the first winding part 25A1 each have four surfaces: an inner peripheral surface, an outer peripheral surface, an upper connecting surface, and a lower connecting surface. Specifically, the second turn part a2 has an inner peripheral surface a21 positioned on the inner side in the radial direction, an outer peripheral surface a22 opposite the inner peripheral surface a21, an upper connecting surface a23 connecting together the inner peripheral surface a21 and the outer peripheral surface a22, and a lower connecting surface a24 opposite the upper connecting surface a23. Similarly, the third turn part a3 has an inner peripheral surface a31 positioned on the inner side in the radial direction, an outer peripheral surface a32 opposite the inner peripheral surface a31, an upper connecting surface a33 connecting together the inner peripheral surface a31 and the outer peripheral surface a32, and a lower connecting surface a34 opposite the upper connecting surface a33.

The turn parts making up the second winding part 25B1 have the same sectional shape as the turn parts making up the first winding part 25A1. Specifically, the first turn part b1 has, in the section obtained by cutting the coil part 25 along a plane passing through the coil axis Ax, an inner peripheral surface b11 positioned on the inner side in the radial direction, an outer peripheral surface b12 opposite the inner peripheral surface b11, an upper connecting surface b13 connecting together the inner peripheral surface b11 and the outer peripheral surface b12, and a lower connecting surface b14 opposite the upper connecting surface b13. The second turn part b2 has an inner peripheral surface b21 positioned on the inner side in the radial direction, an outer peripheral surface b22 opposite the inner peripheral surface b21, an upper connecting surface b23 connecting together the inner peripheral surface b21 and the outer peripheral surface b22, and a lower connecting surface b24 opposite the upper connecting surface b23. The third turn part b3 has an inner peripheral surface b31 positioned on the inner side in the radial direction, an outer peripheral surface b32 opposite the inner peripheral surface b31, an upper connecting surface b33 connecting together the inner peripheral surface b31 and the outer peripheral surface b32, and a lower connecting surface b34 opposite the upper connecting surface b33.

In one embodiment of the invention, the inner peripheral surface a21 of the second turn part a2 protrudes inwardly in the radial direction as shown in FIG. 4. The inner peripheral surface of the other turn parts of the first winding part 25A1 than the second turn part a2 may also protrude inwardly in the radial direction in the same manner as the inner peripheral surface a21 of the second turn part a2.

Specifically, at least one of the inner peripheral surface a11 of the first turn part a1 or the inner peripheral surface a31 of the third turn part a3 may protrude inwardly in the radial direction. The inner peripheral surface of the turn parts of the second winding part 25B1 may also protrude inwardly in the radial direction. Specifically, at least one of the inner peripheral surface b11 of the first turn part b1 of the second winding part 25B1, the inner peripheral surface b21 of the second turn part b2, or the inner peripheral surface b31 of the third turn part b3 may protrude inwardly in the radial direction.

In one embodiment of the invention, the outer peripheral surface a12 is depressed inwardly in the radial direction as shown in FIG. 4. The outer peripheral surface of the other turn parts of the first winding part 25A1 than the first turn part a1 may be also depressed inwardly in the radial direction in the same manner as the outer peripheral surface a12 of the first turn part a1. Specifically, at least one of the outer peripheral surface a22 of the second turn part a2 or the outer peripheral surface a32 of the third turn part a3 may be depressed inwardly in the radial direction. The outer peripheral surface of the turn parts of the second winding part 25B1 may be also depressed inwardly in the radial direction. Specifically, at least one of the outer peripheral surface b12 of the first turn part b1 of the second winding part 25B1, the outer peripheral surface b22 of the second turn part b2, or the outer peripheral surface b32 of the third turn part b3 may be depressed inwardly in the radial direction.

As shown in FIG. 4, in one embodiment of the present invention, the first winding part 25A1 is formed such that a normal NLa at the axial center of the inner peripheral surface a11 of the first turn part a1 runs parallel to the coil axis Ax. Similarly, the second winding part 25B1 is formed such that a normal NLb at the axial center of the inner peripheral surface b11 of the first turn part b1 runs parallel to the coil axis Ax.

Figure 6:
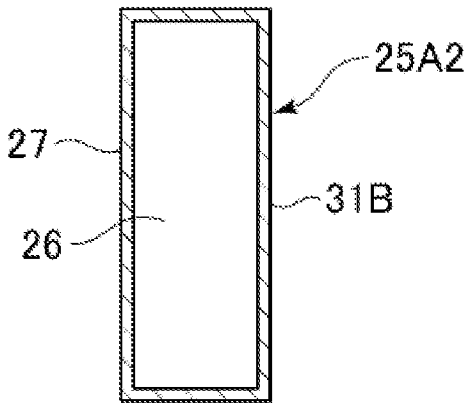
FIG. 6 is a schematic sectional view of a lead-out part of the coil part of the coil component shown in FIG. 1.

Unlike the first to third turn parts a1 to a3 of the first winding part 25A1 and the first to third turn parts b1 to b3 of the second winding part 25B1, the lead-out part 25A2 may not have a radially protruding or depressed surface. FIG. 6 schematically shows a section of the lead-out part 25A2 of the coil part 25. As shown in FIG. 6, the four surfaces defining the lead-out part 25A2 may be flat. As will be described below, the coil part 25 can be made by winding a strip member having a rectangular section around a winding core. The winding core around which the strip member is to be wound may be an arbor or the core of the base body 10 (the area radially inside the first and second winding parts 25A1 and 25B1). The sectional shape of the lead-out part 25A2 may be still the same as the sectional shape of the strip member before it is formed into the coil part 25. The section of the lead-out part 25B2 is not shown in the figure, but may have a similar shape to the section of the lead-out part 25A2.

As described above, the outer peripheral surface a12 of the first turn part a1 is depressed inwardly in the radial direction, and the inner peripheral surface a21 of the second turn part a2 protrudes inwardly in the radial direction. As used herein, the dimension "d1" identified in FIG. 5 represents the depth of the depression of the outer peripheral surface a12. In other words, as used herein, the depth of the depression of the outer peripheral surface a12 is defined as the distance d1 in the radial direction between an outer-peripheral-surface closest portion a12P1, which is a portion of the radially inwardly depressed outer peripheral surface a12 that is the closest to the coil axis Ax, and an outer-peripheral-surface most distant portion a12P2, which is a portion of the radially inwardly depressed outer peripheral surface a12 that is the most distant from the coil axis Ax. The definition of the depth of the outer peripheral surface may be the same for the outer peripheral surfaces of all of the turn parts. For example, the depth of the depression of the outer peripheral surface a22 of the second turn part a2 is represented as the distance d2 in the radial direction between an outer-peripheral-surface closest portion a22P1, which is a portion of the outer peripheral surface a22 that is the closest to the coil axis Ax, and an outer-peripheral-surface most distant portion a22P2, which is a portion of the outer peripheral surface a22 that is the most distant from the coil axis Ax. The depth d2 of the outer peripheral surface a22 may be equal to or less than the depth d1 of the outer peripheral surface a12 (i.e., d2<d1). A large depth d1 of the outer peripheral surface a12 means that the outer peripheral surface a12 is greatly curved. Similarly, a large depth d2 of the outer peripheral surface a22 means that the outer peripheral surface a22 is greatly curved. Depending on the manufacturing conditions of the coil component 1, the insulating coating film 27 on the outer peripheral surface a12 of the first turn part a1 may melt and combine to the insulating coating film 27 on the inner peripheral surface a21 of the second turn part a2. This may make it difficult to clearly see the boundary between the insulating coating film 27 on the outer peripheral surface a12 and the insulating coating film 27 on the inner peripheral surface a21. If it is difficult to clearly see the boundary between the insulating coating film 27 formed on the outer peripheral surface a12 and the insulating coating film 27 formed on the inner peripheral surface a21, the depth of the depression of the outer peripheral surface a12 can be defined as the distance in the radial direction between (i) the portion of the plane extending along the outer peripheral surface a12 of the conductor part 26 of the first turn part a1 that is the closest to the coil axis Ax and (ii) the portion of the plane extending along the outer peripheral surface a12 of the conductor part 26 of the first turn part a1 that is the most distant from the coil axis Ax.

In one embodiment of the present invention, the depth d1 of the outer peripheral surface a12 of the first turn part a1 is greater than the thickness t1 of the portion of the insulating coating film 27 that covers the first turn part a1 (i.e., d1>t1). In this way, the insulating coating film 27 formed on the inner surface a21 of the second turn part a2, which is outside the first turn part a1 in the radial direction, can fill the depressed outer peripheral surface a12 of the first turn part a1, so that the second turn part a2 can be prevented from moving in the axial direction. Similarly, in one embodiment of the present invention, the depth d2 of the outer peripheral surface a22 of the second turn part a2 is greater than the thickness t2 of the portion of the insulating coating film 27 that covers the second turn part a2 (i.e., d2>t2). When the thickness t1 of the insulating coating film 27 is compared against the depth d1 of the outer peripheral surface a12, the thickness of the insulating coating film 27 can be defined as the dimension of the insulating coating film 27 in the radial direction at the position where the insulating coating film 27 touches the outer-peripheral-surface closest portion a12P1, as shown in FIG. 5. Similarly, when the thickness t2 of the insulating coating film 27 is compared against the depth d2 of the outer peripheral surface a22, the thickness of the insulating coating film 27 can be defined as the dimension of the insulating coating film 27 in the radial direction at the position where the insulating coating film 27 touches the outer-peripheral-surface closest portion a22P1, as shown in FIG. 5. In one embodiment of the present invention, the depth d1 of the outer peripheral surface a12 of the first turn part a1 is greater than the sum of the thickness t1 of the portion of the insulating coating film 27 that covers the first turn part a1 and the thickness t2 of the portion of the insulating coating film 27 that covers the second turn part a2 (i.e., d1>(t1+t2)). In one embodiment, the depth d1 of the outer peripheral surface a12 of the first turn part a1 may be greater than twice the thickness t1 of the portion of the insulating coating film 27 that covers the first turn part a1 (i.e., d1>(2×t1)). In this way, the insulating coating film 27 formed on the inner peripheral surface a21 of the second turn part a2, which is outside the first turn part a1 in the radial direction, can fill the depressed outer peripheral surface a12 of the first turn part a1 more deeply. As a result, the second turn part a2 can be further restricted from moving in the axial direction. The same applies to the other turn parts than the first and second turn parts a1 and a2. Like the first and second turn parts a1 and a2, the depth of the outer peripheral surface of each turn part is greater than the thickness of the portion of the insulating coating film 27 that covers the turn part. For example, the depth of the outer peripheral surface b12 of the first turn part b1 of the second winding part 25B1 may be greater than the thickness of the portion of the insulating coating film 27 that covers the first turn part b1.

As described above, the inner peripheral surface a21 of the second turn part a2 protrudes inwardly in the radial direction. In one embodiment, the inner peripheral surface a21 of the second turn part a2 is shaped complementarily to the outer peripheral surface a12 of the first turn part a1. When the inner peripheral surface a21 of the second turn part a2 is shaped complementarily to the outer peripheral surface a12 of the first turn part a1, the outer peripheral surface a12 of the first turn part a1 can establish surface contact with the inner peripheral surface a21 of the second turn part a2. This increases the frictional force between the first turn part a1 and the second turn part a2, thereby preventing the second turn part a2 from moving in the axial direction relative to the first turn part a1.

In one embodiment of the present invention, an inner-peripheral-surface closest portion a21P1 of the inner peripheral surface a12 of the second turn part a2, which is the closest to the coil axis Ax, is located closer to the coil axis Ax in the radial direction than is the outer-peripheral-surface most distant portion a12P2 of the outer peripheral surface a12 of the first turn part a1. This allows the outer-peripheral-surface most distant portion a12P2 of the first turn part a1 to support in the axial direction the inner-peripheral-surface closest portion a21P1 of the second turn part a2, so that the second turn part a2 can be more reliably restricted from moving in the axial direction.

The foregoing description on the first and second turn parts a1 and a2 also applies to the other turn parts as long as no contradiction arises. For example, the inner-peripheral-surface closest portion of the inner peripheral surface a31 of the third turn part a3, which is the closest to the coil axis Ax, may be located closer to the coil axis Ax in the radial direction than is the outer-peripheral-surface most distant portion a22P2 of the outer peripheral surface a22 of the second turn part a2. Furthermore, the inner-peripheral-surface closest portion of the inner peripheral surface b21 of the second turn part b2 of the second winding part 25B1 that is the closest to the coil axis Ax may be located closer to the coil axis Ax in the radial direction than is the outer-peripheral-surface most distant portion of the outer peripheral surface b12 of the first turn part b1 that is the most distant from the coil axis Ax.

In one embodiment of the present invention, the first turn part a1 of the first winding part 25A1 is sized such that the ratio of its dimension Ta1 in the axial direction to its dimension La1 in the radial direction, which is referred to as the aspect ratio (i.e., Ta1/La1), is in the range of 0.5 to 2.0. The dimension of the first turn part a1 in the radial direction denotes the distance in the radial direction (L-axis direction) between the inner-peripheral-surface closest portion a11P1 of the inner peripheral surface a11 of the first turn part a1 that is the closest to the coil axis Ax and the outer-peripheral-surface most distant portion a12P2 of the outer peripheral surface a12 that is the most distant from the coil axis Ax. The dimension of the first turn part a1 in the axial direction denotes the distance in the axial direction between the top portion of the first turn part a1 in the axial direction (the end on the positive side in the T-axis direction) and the bottom portion of the first turn part a1 in the axial direction (the end on the negative side in the T-axis direction). In the embodiment shown, the dimension of the first turn part a1 in the axial direction is defined as the distance between the top end and the bottom end of the inner peripheral surface 11*a* of the first turn part a1. For the other turn parts of the first winding part 25A1 than the first turn part a1 and the turn parts of the second winding part 25B1 of the coil part 25, the aspect ratio can fall within the same range as the aspect ratio of the first turn part a1. The other turn parts of the first winding part 25A1 than the first turn part a1 and the turn parts of the second winding part 25B1 may be formed such that the aspect ratio falls within the range of 0.5 to 2.0. In one embodiment of the present invention, the ratio of the longer side to the shorter side of the section of the lead-out part 25A2 shown in FIG. 6 is greater than 1.0 and equal to or less than 2.0. When the aspect ratio of the turn parts is calculated, the dimensions of the section of the turn parts are measured and the section is obtained by cutting the coil conductor 1 along a plane passing through the coil axis Ax. The aspect ratio is calculated by measuring the dimensions of such a section.

The following now describes a method of manufacturing the coil component 1 according to one embodiment of the invention. To begin with, the method of making the coil part 25 is described. The coil part 25 can be made using commercially available spindle-type coil winding machines, commercially available flyer-type coil winding machines, or other known coil winding machines. To make the coil part 25, a bobbin having a strip member made of a conductive material and covered with the insulating coating film 27 wound around it is set in a winding machine. The strip member has, for example, a rectangular section.

Figure 7A:
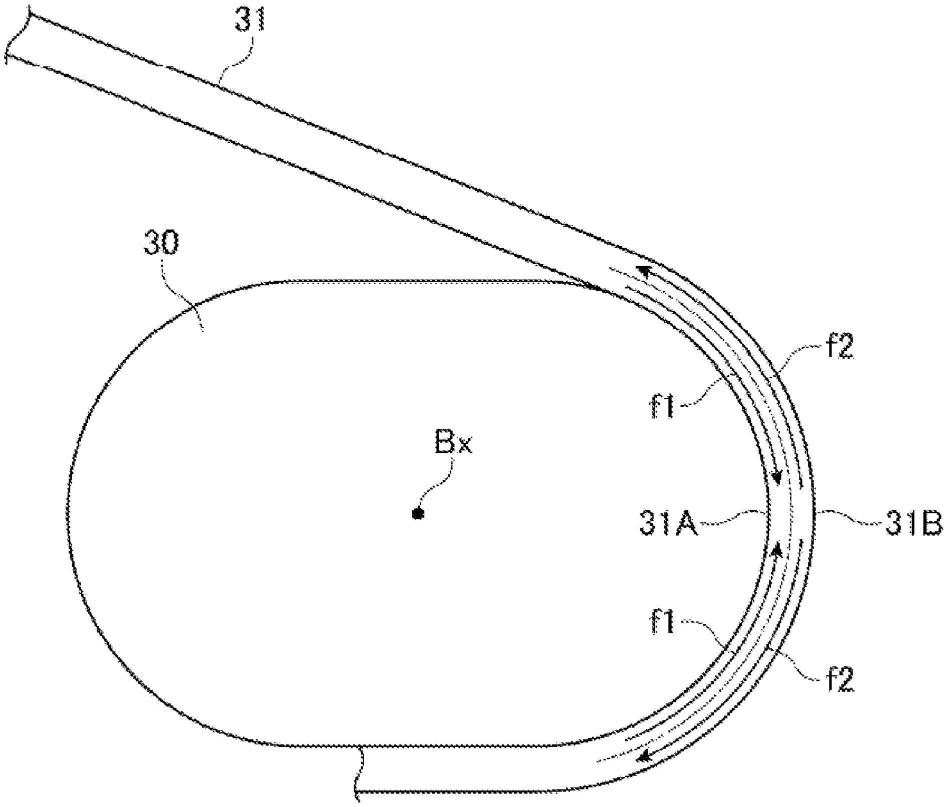
FIG. 7A schematically illustrates some of the steps of the process of manufacturing the coil component 1.

In the winding machine, a transport roller transports the strip member from the bobbin to a nozzle and the nozzle can feed the strip member to the vicinity of an arbor, which is a winding core. FIG. 7A shows an example of an arbor 30. FIG. 7A shows a section orthogonal to the axis of rotation Bx of the arbor 30 (when the arbor 30 is stationary and the nozzle turns, the axis of rotation Bx of the arbor 30 means the axis of revolution of the nozzle. This holds true in the following description). The outer peripheral surface of the arbor 30 defines a shape corresponding to the shape defined by the inner peripheral surface of the coil part 25. For example, the section of the arbor 30 shown in FIG. 7A is shaped like an ellipse, which corresponds to the shape defined by the inner peripheral surface of the coil part 25 (the inner peripheral surface a11 of the first turn part a1) when viewed in the T-axis direction. The shape of the arbor 30 is not limited to the one illustrated in FIG. 7A.

When a spindle-type winding machine is used, the arbor 30 is supported on a spindle such that the arbor 30 can rotate on its own axis around the axis of rotation Bx. The nozzle, which is not shown in the drawing, is configured to move in three axial directions in synchronization with or independently of the rotation of the arbor 30. To wind a strip member 31 around the arbor 30, the nozzle is positioned appropriately relative to the arbor 30, and the arbor 30 is then rotated relative to the nozzle while tension is being applied to the strip member 31 from the nozzle. When a spindle-type winding machine is used, the arbor 30 rotates on its own axis. When a flyer-type winding machine is used, on the other hand, the nozzle revolves around the arbor 30. The tension applied to the strip member 31 is adjusted so that the strip member 31 can be wound around the arbor without loosening. When the coil component 1 has the first winding part 25A1, the second winding part 25B1, and the connecting part 25C as shown in FIG. 1, the strip member 31 is wound around the arbor 30 using a flyer-type winding machine. When a flyer-type winding machine is used, the first step is to form the connecting part 25C. To this end, the portion of the strip member 31 corresponding to the connecting part 25C is pressed against the arbor 30 at an angle relative to the axis Bx. Subsequently, while this portion of the strip member 31 corresponding to the connecting part 25C remains pressed against the arbor 30, the portion of the strip member 31 corresponding to the first turn of the first winding part 25A1 and the first turn of the second winding part 25B1 is wound such that the inner peripheral surface 31A of the strip member 31 touches the outer peripheral surface of the arbor 30. Following the winding of the first turns, the strip member 31 is wound such that the inner peripheral surface of the portion of the strip member 31 corresponding to the second turns touches the outer peripheral surface 31B of the portion of the strip member 31 corresponding to the first turns. The portions of the strip member 31 corresponding to the third and subsequent turns are similarly wound around the outer peripheral surface of the portions of the strip member 31 corresponding to the preceding turns. The above-described winding process results in the portions of the strip member 31 corresponding to the respective turns being aligned next to each other in the radial direction centered on the axis of rotation Bx of the arbor 30 and orthogonal to the axis of rotation Bx.

During the winding process, the strip member 31 is wound around the arbor 30 while receiving tension from the nozzle. Accordingly, while each turn is wound, an inner-peripheral-surface-side region R1 of the turn that is close to the axis of rotation Bx of the arbor 30 receives a compressive force that compresses the strip member 31 in the circumferential direction around the axis of rotation Bx, and an outer-peripheral-surface-side region R2 of the turn that is distant from the axis rotation Bx of the arbor 30 receives a tensile force that stretches the strip member 31 in the circumferential direction around the axis of rotation Bx. FIG. 7A illustrates a compressive force f1 and a tensile force f2 acting on the strip member 31 when the first turn of the strip member 31 is wound around the arbor 30. Specifically, in the embodiment shown in FIG. 7A, the inner-peripheral-surface-side region R1 of the first turn of the strip member 31 receives the compressive force f1 that compresses the strip member 31 in the circumferential direction around the axis of rotation Bx, and the outer-peripheral-surface-side region R2 distant from the axis of rotation Bx of the arbor 30 receives the tensile force f2 that stretches the strip member 31 in the circumferential direction. Here, observing a section of the strip member 31 obtained by cutting the strip member 31 along a plane passing through the axis of rotation Bx shown in FIG. 7B finds that the compressive force f1 acting in the circumferential direction expands, in the top-bottom direction, a portion of the conductor part 31*a* of the strip member 31 that is located in the inner-peripheral-surface-side region R1 as if the portion is pushed out and that the tensile force f2 acting in the circumferential direction contracts a portion of the conductor part 31*a* that is located in the outer-peripheral-surface-side region R2 in the top-bottom direction as if it shrinks toward the center in the top-bottom direction. The insulating coating film 31*b* covering the conductor part 31*a* follows the deformation of the conductor part 31*a* and resultantly deforms. As a result, when wound around the arbor 30, the strip member 31 is deformed such that its inner peripheral surface 31A protrudes toward the axis of rotation Bx of the arbor 30 and its outer peripheral surface 31B protrudes toward the axis of rotation Bx (see FIG. 7C). FIG. 7C shows the section of the first turn of the strip member 31, but the same deformation occurs in the second and subsequent turns.

By winding the strip member 31 around the arbor 30 in the above manner a predetermined number of turns (e.g., three turns), the first and second winding parts 25A1 and 25B1 of the coil part 25 are made. After this, the ends of the first and second winding parts 25A1 and 25B1 of the strip member 31 are bent in the direction along the axis of rotation Bx, so that the lead-out parts 25A2 and 25B2 are made. Subsequently, the strip member 31 is cut at the positions corresponding to the ends of the lead-out parts 25A2 and 25B2, so that the coil part 25 can be separated from the strip member 31 placed on the bobbin. The coil part 25 made in this way is removed from the arbor 30 and then placed in a molding die.

Following this, a slurry obtained by mixing and kneading metal magnetic particles and a resin material is poured into the molding die where the coil part 25 is placed, and molding pressure is applied to the slurry in the molding die, to make a molded body. In one embodiment, the molding pressure is applied in the direction along the coil axis Ax of the coil part 25 placed in the molding die. There are no particular restrictions on the magnetic and resin materials contained in the slurry, and any known magnetic and resin materials can be used. Subsequently, the molded body is heated, so that a magnetic base body having the coil part 25 enclosed therein is made. The base body 10 may be a dense sintered body, which is obtained by heating the molded body to sinter the metal magnetic particles contained in the molded body, or a structure, which is obtained by curing the resin material in the molded body to cause the metal magnetic particles bind to each other.

Following this, a conductive paste is applied to the surface of the base body 10 to form the external electrodes 21 and 22. The external electrode 21 is electrically connected to one end of the coil part 25 placed within the magnetic base body 10, and the external electrode 22 is electrically connected to the other end of the coil part 25 placed within the magnetic base body 10. The external electrodes 21, 22 may include a plating layer. There may be two or more plating layers. The two plating layers may include an Ni plating layer and an Sn plating layer externally provided on the Ni plating layer.

In the above-described manner, the coil component 1 is produced. The method of manufacturing the coil component 1 is not limited to the method described above. The coil component 1 may be fabricated, for example, by making a core made of a magnetic material and winding the strip member 31 around a winding core portion of the core. The strip member 31 may be wound around the core in the same manner as when the strip member 31 is wound around the arbor 30. In the coil component 1 made by winding the strip member 31 around the core, the coil part 25 is provided on the surface of the magnetic base body 10. The core can be shaped in any appropriate manner. For example, the core can be shaped like a rod (I-shape), a rivet (T-shape), a bobbin (drum-shape), or E.

Figure 7B:
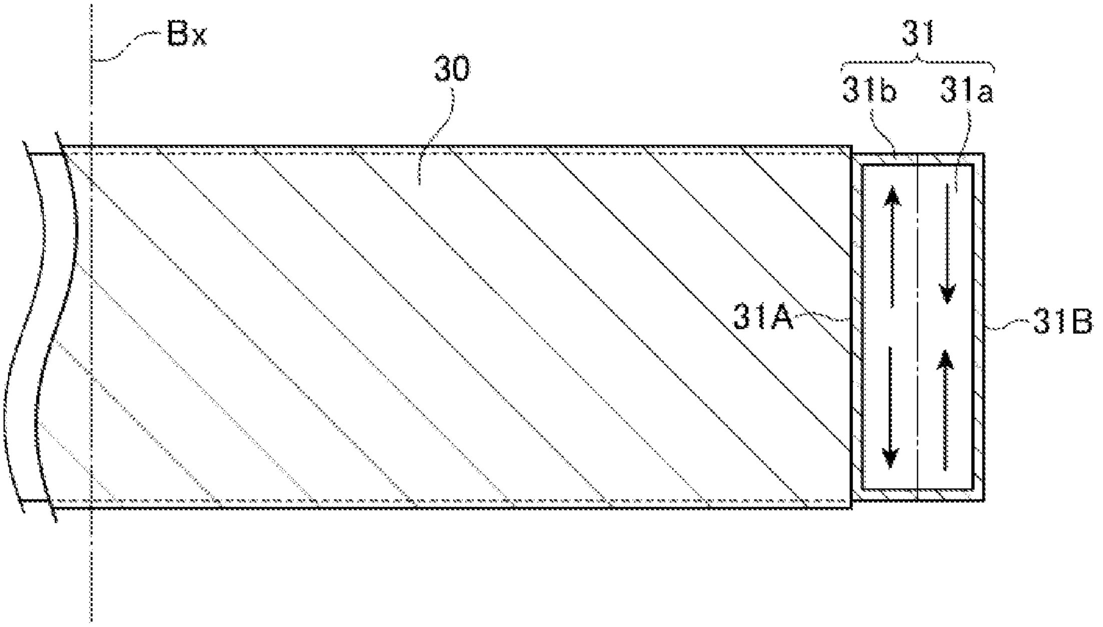
FIG. 7B schematically shows a section of a strip member (before deformed) obtained by cutting the strip member along a plane extending along an axis of rotation of a winding core shown in FIG. 7A.
Figure 7C:
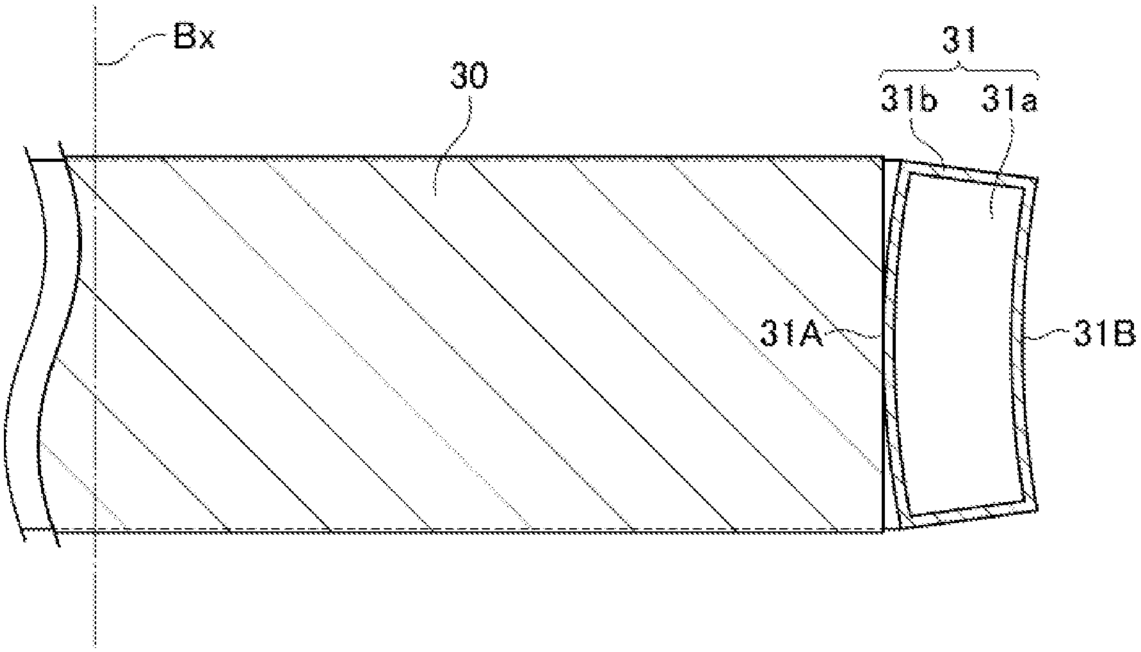
FIG. 7C schematically shows the section of the strip member (after deformed) obtained by cutting the strip member along the plane extending along the axis of rotation of the winding core shown in FIG. 7A.

The coil part 25 is made from the strip member 31 having a rectangular section as shown in FIG. 7B. The strip member 31 may be shaped such that its section has curved vertices. In one embodiment of the present invention, the expression "strip member aspect ratio" means the ratio of the dimension of the section of the strip member 31 shown in FIG. 7B in the axial direction extending along the axis of rotation Bx to the dimension of the section in the radial direction orthogonal to the axis of rotation Bx and centered around the axis of rotation Bx, and the strip member aspect ratio falls within the range of 0.5 to 2.0. According to the study conducted by the inventors of the present invention, when a strip member having a strip member aspect ratio of greater than 2.0 is wound around an arbor, only weak compressive and tensile forces act in the circumferential direction respectively in the inner-peripheral-surface-side region of the strip member (the region corresponding to the inner-peripheral-surface-side region R1 of the strip member 31) and in the outer-peripheral-surface-side region (the region corresponding to the outer-peripheral-surface-side region R2 of the strip member 31). Therefore, unlike the coil part 25 according to the embodiment of the present invention, where the inner and outer peripheral surfaces of the first to third turn parts a1 to a3 and the first to third turn parts b1 to b3 are curved, a coil part made from a strip member having a strip member aspect ratio of greater than 2.0 does not have curved inner and outer peripheral surfaces. On the other hand, when a strip member having a strip member aspect ratio of less than 0.5 is wound around an arbor, strong compressive and tensile forces act in the circumferential direction respectively in the inner- and outer-peripheral-surface-side regions of the strip member. When a strip member has a strip member aspect ratio of less than 0.5, however, its top and bottom surfaces in the direction extending along the axis of rotation of the arbor have a large area. Accordingly, the deformation of the strip member caused by the compressive and tensile forces acting in the circumferential direction can be absorbed by slight extension and contraction in the top-bottom direction in the inner- and outer-peripheral surface side regions of the strip member. For this reason, unlike the coil part 25 according to the embodiment of the present invention, where the inner and outer peripheral surfaces of the first to third turn parts a1 to a3 and the first to third turn parts b1 to b3 are curved, a coil part made from a strip member having a strip member aspect ratio of less than 0.5 does not have curved inner and outer peripheral surfaces. The strip member aspect ratio is approximately equal to the aspect ratio of the coil part 25, where the inner and outer peripheral surfaces of the strip member 31 are already curved.

When the strip member 31 is wound around the arbor 30, the compressive force f1 applied to the inner-peripheral-surface-side region R1 of the strip member 31 and the tensile force f2 applied to the outer-peripheral-surface-side region R2 may be increased. This can curve the inner and outer peripheral surfaces of the first to third turn parts a1 to a3 and the first to third turn parts b1 to b3 of the coil part 25. In order to apply sufficiently strong compressive and tensile forces f1 and f2 to form the curved inner and outer peripheral surfaces of the first to third turn parts a1 to a3 and the first to third turn parts b1 to b3 of the coil part 25, the radius of curvature of the strip member 31 is desirably small, when viewed in the direction of the axis of rotation Bx of the arbor 30 (the view in FIG. 7A). To accomplish this goal, the curvature of the curved portion of the arbor 30 is determined such that the coil part 25 of the finished product has a radius-to-thickness ratio of 1 to 3, as described above. Here, the radius-to-thickness ratio denotes the ratio of (i) the radius r1 of the curved portion (for example, the first half circular part 25H1 and the second half circular part 25H2), as viewed in the direction of the coil axis, of the inner peripheral surface of the coil part 25 (the inner peripheral surface a11 of the first turn part a1 and the inner peripheral surface b11 of the first turn part b1) to (ii) the thickness T1 of the respective turn parts. When the strip member 31 is wound a plurality of turns, the radially outer turn has a larger radius of curvature than the radially inner turn when seen in the direction of the axis of rotation Bx of the arbor 30. Therefore, if the strip member 31 is wound too many turns, this may make it difficult to exert sufficient compressive and tensile forces while the strip member 31 is wound. Accordingly, the number of turns the strip member 31 is wound (i.e., the numbers of turns making up the first and second winding parts 25A1 and 25B1 of the finished coil part 25) is limited to fall within the range of two to five.

In order to apply sufficiently strong compressive and tensile forces f1 and f2 to form the curved inner and outer peripheral surfaces of the first to third turn parts a1 to a3 and the first to third turn parts b1 to b3 of the coil part 25, a sufficiently high tension needs to be applied to the strip member 31 when the strip member 31 is wound around the arbor 30. As the sectional area of the strip member 31 increases, the tension applied while the strip member 31 is wound increases.

When the strip member 31 is wound around the arbor 30 more than one turn, the tension applied to the strip member 31 when an inner turn is wound may be greater than the tension applied to the strip member 31 when an outer turn is wound. For example, when the strip member 31 is wound around the arbor 30 three turns, the tension applied to the strip member 31 can be adjusted such that the highest tension is applied to the strip member 31 while the first turn is wound, and the lowest tension is applied to the strip member 31 while the third turn is wound. If the tension is adjusted in the above manner during the making of the coil part 25, a section of the coil part 25 obtained by cutting the coil part 25 along a plane passing through the coil axis shows that the inner and outer peripheral surfaces of the first turn part from the coil axis Ax (e.g., the first turn part a1) can be curved more than the inner and outer peripheral surfaces of the second and third turn parts (e.g., the second and third turn parts a2 and a3). In this way, when the strip member 31 is wound around the arbor 30, the second turn of the strip member 31 is prevented by the first turn of the strip member 31 from moving in the direction along the axis of rotation Bx, so that the second turn can avoid moving out of the aligned position.

When the strip member 31 is wound around the arbor 30, the strip member 31 and the arbor 30 may be heated to about 120° C. If the strip member 31 is heated, the insulating coating film 31*b* is preferably made of a highly heat-resistant thermosetting resin. The insulating coating film 31*b* can be, for example, made of polyamide-imide having a heat resistant temperature of 150° C. or higher. A layer of adhesive may be formed on the surface of the insulating coating film 31*b*. This layer of adhesive may be a layer of adhesive made of a thermoplastic resin.

Figure 8:
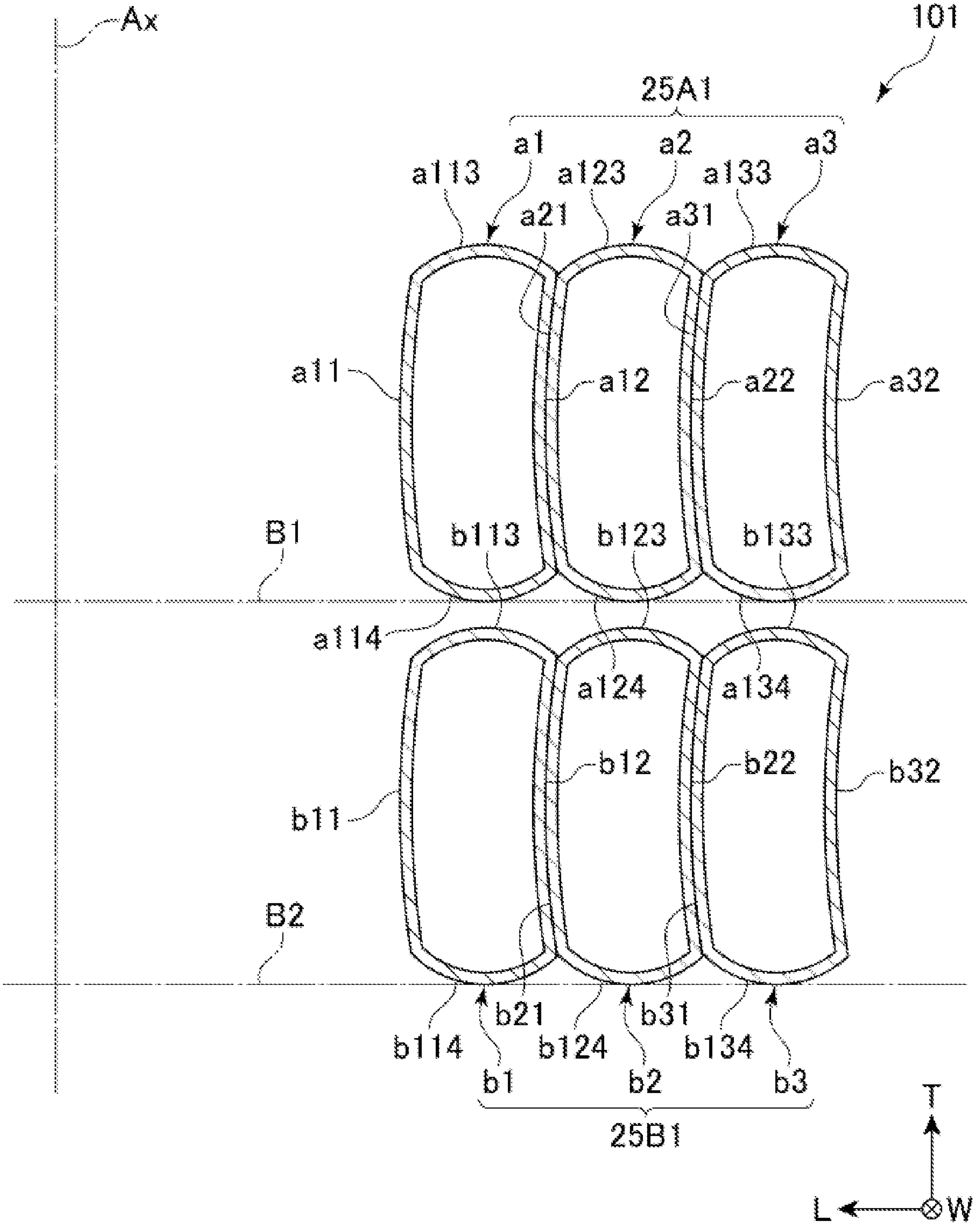
FIG. 8 is a sectional view schematically showing part of a coil part of a coil component according to another embodiment of the present invention, when cut along a plane passing through a coil axis.

The following describes a coil component 101 according to another embodiment of the invention with reference to FIG. 8. FIG. 8 is a schematic sectional view showing part of a coil part 25 of the coil component 101. Since the coil component 101 differs from the coil component 1 in terms of the shape of the coil part 25, the following description focuses on the difference between the coil part 25 of the coil component 101 and the coil part 25 of the coil component 1.

In the coil part 25 of the coil component 101, the upper and lower connecting surfaces of each turn part are curved. More specifically, as shown in FIG. 8, a first turn part a1 has, in the section obtained by cutting the coil part 25 along a plane passing through the coil axis Ax, an upper connecting surface a113 connecting together an inner peripheral surface a11 and an outer peripheral surface a12, and a lower connecting surface a114 opposite the upper connecting surface a113. The upper connecting surface a113 protrudes upwardly in the axial direction, and the lower connecting surface a114 protrudes downwardly in the axial direction. The upper and lower connecting surfaces a113 and a114 are both curved.

The upper and lower connecting surfaces defining second and third turn parts a2 and a3 are shaped in the same manner as the upper and lower connecting surfaces a113 and a114. Specifically, the second turn part a2 has an upper connecting surface a123 connecting together an inner peripheral surface a21 and an outer peripheral surface a22 and a lower connecting surface a124 opposite the upper connecting surface a123, and the third turn part a3 has an upper connecting surface a133 connecting together an inner peripheral surface a31 and an outer peripheral surface a32 and a lower connecting surface a134 opposite the upper connecting surface a133. The upper connecting surfaces a123 and a133 protrude upwardly in the axial direction, and the lower connecting surfaces a124 and a134 protrude downwardly in the axial direction. The upper connecting surfaces a123 and a133 and the lower connecting surfaces a124 and a134 are all curved.

The foregoing description about the first, second and third turn parts a1, a2 and a3 also applies to first, second and third turn parts b1, b2 and b3 of a second winding part 25B1. Specifically, upper connecting surfaces b113, b123, and b133 of the respective turn parts are all curved surfaces protruding upwardly in the axial direction, and lower connecting surfaces b114, b124, and b134 are all curved surfaces protruding downwardly in the axial direction.

According to the coil component 101, each of the turn parts making up the first winding part 25A1 faces a corresponding one of the turn parts of the second winding part 25B1 such that their curved surfaces face each other. Such arrangement can prevent dielectric breakdown from occurring at the positions where the oppositely positioned turn parts touch each other. For example, the lower connecting surface a114 of the first turn part a1 of the first winding part 25A1 faces the upper connecting surface b113 of the first turn part b1 of the second winding part 25B1. Since the lower connecting surface a114 of the first turn part a1 and the upper connecting surface b113 of the first turn part b1 are both curved surfaces, they will establish surface contact when touching. This prevents a force from being applied locally to the insulating coating film 27, so that the insulating coating film 27 can avoid being torn out. As a result, the present embodiment can restrict dielectric breakdown, which can be caused by a crack of the insulating coating film 27.

Figure 9:
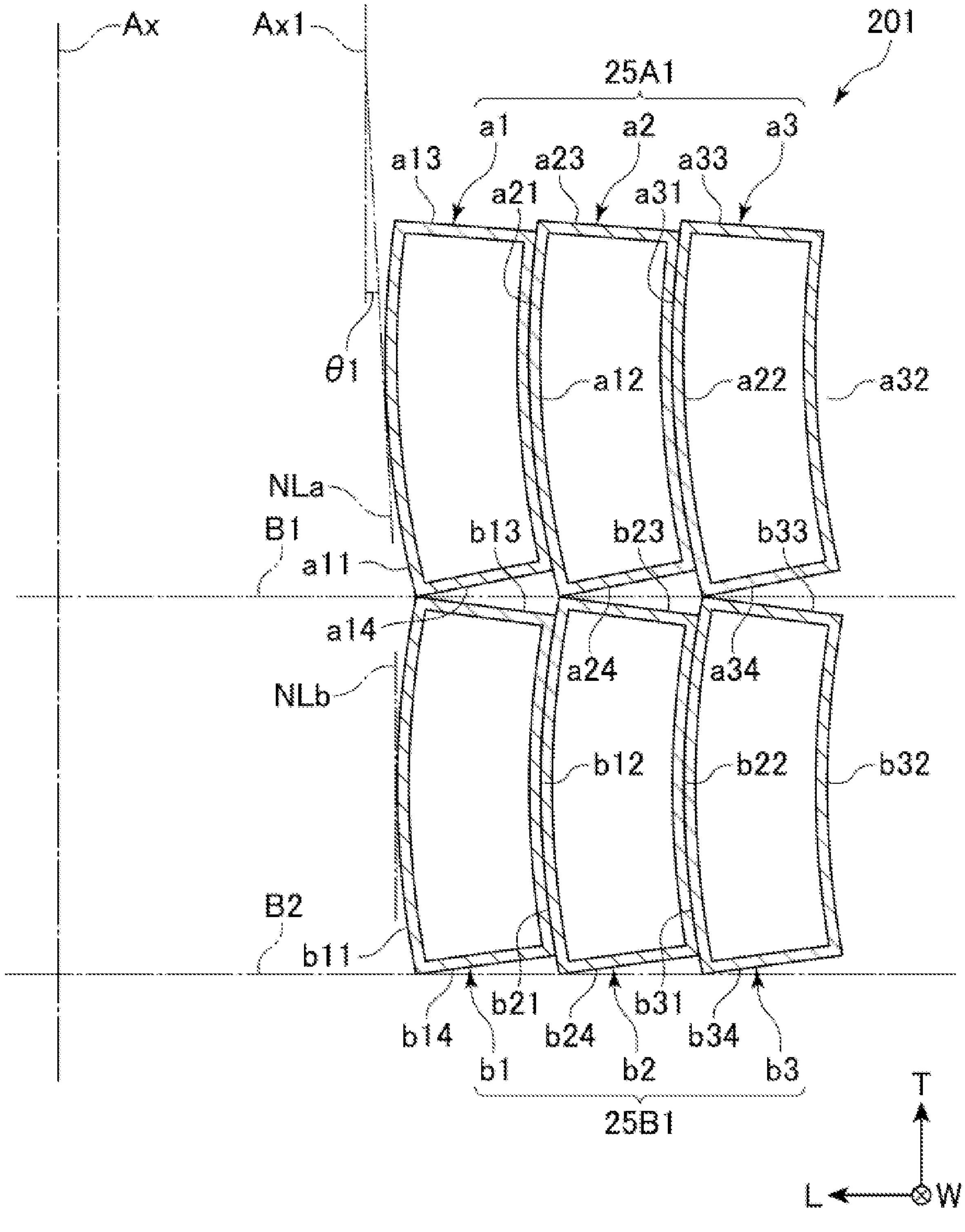
FIG. 9 is a sectional view schematically showing part of a coil part of a coil component according to another embodiment of the present invention, when cut along a plane passing through a coil axis.

The following describes a coil component 201 according to another embodiment of the invention with reference to FIG. 9. FIG. 9 is a schematic sectional view showing part of a coil part 25 of the coil component 201. Since the coil component 201 differs from the coil component 1 in terms of the shape of the coil part 25, the following description focuses on the difference between the coil part 25 of the coil component 201 and the coil part 25 of the coil component 1.

In the coil part 25 of the coil component 201, a first winding part 25A1 is made up by a first turn part a1, a second turn part a2, and a third turn part a3, which are tilted toward the coil axis Ax. Accordingly, a normal NLa at the axial center of an inner peripheral surface a11 of the first turn part a1 does not run parallel to the coil axis Ax and is tilted at a predetermined angle relative to the coil axis Ax. Specifically, the line segment extending from the inner peripheral surface a11 of the first turn part a1 to the coil axis Ax along the normal NLa is tilted relative to the coil axis Ax and makes an angle θ1 smaller than 90°. For the purpose of intelligibility, FIG. 9 places an axial line Ax1 parallel to the coil axis Ax near the first turn part a1 and shows the angle θ1 as the angle formed between the axial line Ax1 and the normal NLa. Needless to say, in the embodiment shown in FIG. 9, the angle between the line segment extending from the normal NLa to the coil axis Ax and the coil axis Ax is equal to the angle θ1. On the other hand, a normal NLb at the axial center of an inner peripheral surface b11 of a first turn part b1 runs parallel to the coil axis Ax. In this manner, in the coil component 201, the first and second winding parts 25A1 and 25B1 are asymmetric.

In the coil component 201, while the first and second winding parts 25A1 and 25B1 are asymmetric, the turn parts making up the first winding part 25A1 (the first to third turn parts a1 to a3) are aligned next to each other on a winding plane B1 representing an aligned position, and the turn parts making up the second winding part 25B1 (the first to third turn parts b1 to b3) are aligned next to each other on a winding plane B2 representing an aligned position.

Figure 10:
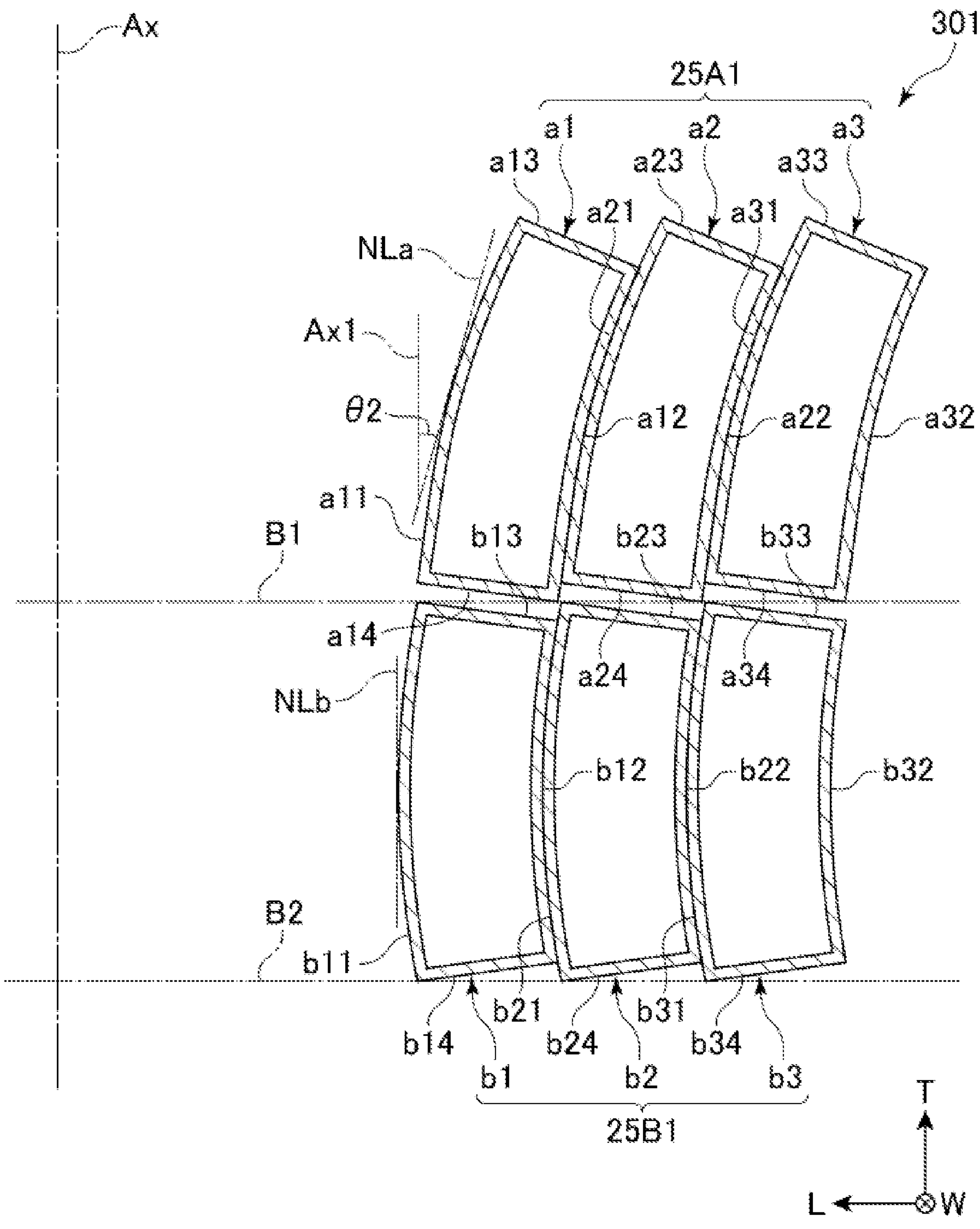
FIG. 10 is a sectional view schematically showing part of a coil part of a coil component according to another embodiment of the present invention, when cut along a plane passing through a coil axis.

The following describes a coil component 301 relating to another embodiment of the present invention with reference to FIG. 10. FIG. 10 is a schematic sectional view showing part of a coil part 25 of the coil component 301. Since the coil component 301 differs from the coil component 1 in terms of the shape of the coil part 25, the following description focuses on the difference between the coil part 25 of the coil component 301 and the coil part 25 of the coil component 1.

In the coil part 25 of the coil component 301, first, second and third turn parts a1, a2 and a3 making up a first winding part 25A1 are tilted away from the coil axis Ax. Specifically, the line segment extending from an inner peripheral surface a11 of the first turn part a1 to the coil axis Ax along a normal NLa at the axial center of the inner peripheral surface a11 of the first turn part a1 is tilted relative to the coil axis Ax and makes an angle θ2 smaller than 90°. On the other hand, a normal NLb at the axial center of an inner peripheral surface b11 of a first turn part b1 runs parallel to the coil axis Ax. In this manner, in the coil component 301, the first and second winding parts 25A1 and 25B1 are asymmetric.

In the coil component 301, while the first and second winding parts 25A1 and 25B1 are asymmetric, the turn parts making up the first winding part 25A1 (the first to third turn parts a1 to a3) are aligned next to each other on a winding plane B1 representing an aligned position, and the turn parts making up the second winding part 25B1 (the first to third turn parts b1 to b3) are aligned next to each other on a winding plane B2 representing an aligned position.

In the coil components 201 and 301, the first and second winding parts 25A1 and 25B1 are asymmetric. Specifically, the first and second winding parts 25A1 and 25B1 are arranged such that the angle (e.g., θ1, θ2) made between the turns of the first winding part 25A1 and the coil axis Ax is greater than the angle made between the turns of the second winding part 25B1 and the coil axis Ax. Accordingly, when the coil part is placed in a molding die and subjected to compression molding to form the base body 10, the first winding part 25A1 is more likely to be deformed by the molding pressure than the second winding part 25B1. Accordingly, when the molding pressure is applied to the coil part 25, the deformation of the first winding part 25A1 can contribute to reduce the deformation of the second winding part 25B1. Considering this, if the second winding part 25B1 is positioned accurately in the molding die, the coil part 25 can be accurately positioned relative to the base body 10.

Figure 11:
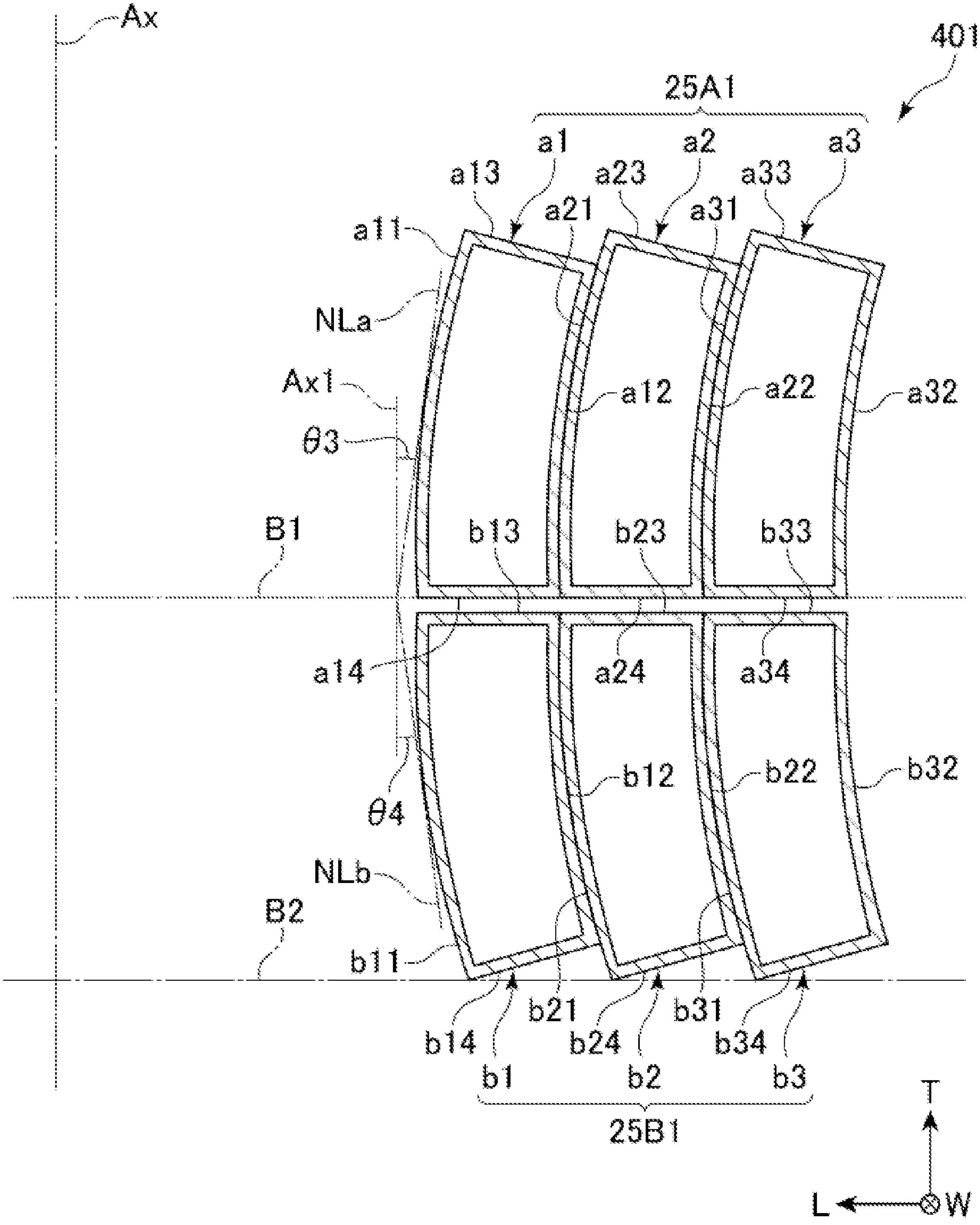
FIG. 11 is a sectional view schematically showing part of a coil part of a coil component according to another embodiment of the present invention, when cut along a plane passing through a coil axis.

The following describes a coil component 401 according to another embodiment of the invention with reference to FIG. 11. FIG. 11 is a schematic sectional view showing part of a coil part 25 of the coil component 401. Since the coil component 401 differs from the coil component 1 in terms of the shape of the coil part 25, the following description focuses on the difference between the coil part 25 of the coil component 401 and the coil part 25 of the coil component 1.

In the coil part 25 of the coil component 401, first, second and third turn parts a1, a2 and a3 making up a first winding part 25A1 are tilted away from the coil axis Ax, and first, second and third turn parts b1, b2 and b3 making up a second winding part 25B1 are tilted toward the coil axis Ax. In other words, the first, second and third turn parts b1, b2 and b3 making up the second winding part 25B1 are tilted oppositely to the first, second and third turn parts a1, a2 and a3 of the first winding part 25A1. According to the embodiment shown in FIG. 11, the line segment extending from an inner peripheral surface a11 of the first turn part a1 to the coil axis Ax along a normal NLa at the axial center of the inner peripheral surface a11 of the first turn part a1 is tilted relative to the coil axis Ax and makes an angle θ3 smaller than 90°, and the line segment extending from an inner peripheral surface b11 of the first turn part b1 to the coil axis Ax along a normal NLb at the axial center of the inner peripheral surface b11 of the first turn part b1 is tilted relative to the coil axis Ax and makes an angle θ4 smaller than 90°. The angle θ4 may be equal to the angle θ3.

In the coil component 401, while the turn parts making up the first winding part 25A1 (the first to third turn parts a1 to a3) are aligned next to each other on a winding plane B1 representing an aligned position, the turn parts making up the second winding part 25B1 (the first to third turn parts b1 to b3) are aligned next to each other on a winding plane B2 representing an aligned position.

In the coil component 401, the first, second and third turn parts a1, a2 and a3 making up the first winding part 25A1 are tilted toward the first, second and third turn parts b1, b2 and b3 making up the second winding part 25B1, and vice versa. For example, the first turn part a1 of the first winding part 25A1 is tilted toward the first turn part b1 of the second winding part 25B1. With such arrangements, when the molding pressure is applied in the direction along the coil axis Ax to make the base body 10, the first, second and third turn parts a1, a2 and a3 making up the first winding part 25A1 support the first, second and third turn parts b1, b2 and b3 making up the second winding part 2581, and vice versa. In this way, the present embodiment can prevent the molding pressure applied during the molding process from moving the first, second and third turn parts a1, a2 and a3 and the first, second and third turn parts b1, b2 and b3 out of the aligned position in the axial direction. Specifically, when the molding pressure is applied in the axial direction, a downward stress is applied to the first turn part a1, but an upward stress is applied to the first turn part b1, which is positioned opposite the first turn part a1 in the axial direction. The upward stress acting on the first turn part b1 can support the first turn part a1, which is receiving a downward stress. In this manner, the first turn part a1 can be prevented from moving in the axial direction. The same mechanism can prevent the first turn part b1 from moving in the axial direction. The same mechanism also works for the other pairs of the turn parts facing in the axial direction (for example, the second turn parts a2 and b2, and the third turn parts a3 and b3). The turn parts facing each other in the axial direction restrict each other from moving in the axial direction. As a result, in the coil component 401, the first to third turn parts a1 to a3 and the first to third turn parts b1 to b3 are prevented from moving out of the aligned position in the axial direction.

Figure 12:
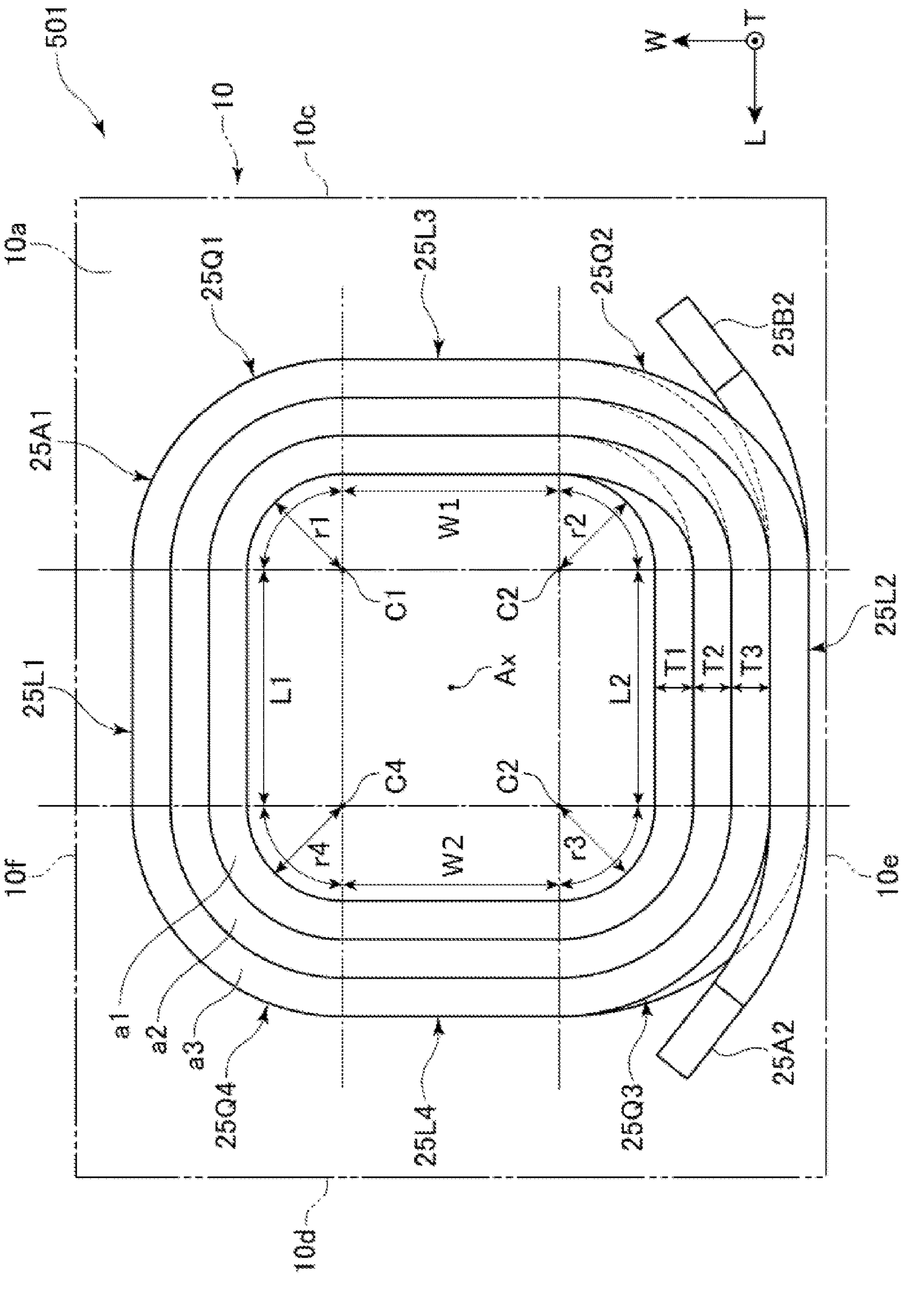
FIG. 12 is a plan view schematically showing a coil component according to another embodiment of the present invention.

The following describes a coil component 501 according to another embodiment of the invention with reference to FIG. 12. FIG. 12 is a schematic plan view showing the coil component 501. Since the coil component 501 differs from the coil component 1 in terms of the shape of a base body 10 and the shape of a coil part 25, the following description focuses on the difference between (i) the base body 10 and the coil part 25 of the coil component 501 and (ii) the base body 10 and the coil part 25 of the coil component 1.

The coil part 25 of the coil component 501 differs from the coil part 25 of the coil component 1 in terms of the shape in plan view. A first winding part 25A1 of the coil component 501 has, in plan view, a first straight part 25L1 extending linearly along the L-axis direction and having a length L1, a second straight part 25L2 extending parallel to the first straight part 25L1, having a length L2 and located on the negative side of the first straight part 25L1 in the W-axis direction, a third straight part 25L3 extending linearly in the W-axis direction and having a length W1, a fourth straight part 25L4 extending parallel to the third straight part 25L3, having a length W2 and located on the positive side of the third straight part 25L3 in the L-axis direction, a first quarter circular part 25Q1 connecting together the negative-side end of the first straight part 25L1 in the L-axis direction and the positive-side end of the third straight part 25L3 in the W-axis direction and extending 90° around a center C1, a second quarter circular portion 25Q2 connecting together the negative-side end of the third straight part 25L3 in the W-axis direction and the negative-side end of the second straight part 25L2 in the L-axis direction and extending 90° around a center C2, a third quarter circular portion 25Q3 connecting together the positive-side end of the second straight part 25L2 in the L-axis direction and the negative-side end of the fourth straight part 25L4 in the W-axis direction and extending 90° around a center C3, and a fourth quarter circular portion 25Q4 connecting together the positive-side end of the fourth straight part 25L4 in the W-axis direction and the positive-side end of the first straight part 25L1 in the L-axis direction and extending 90° around a center C4.

The inner peripheral surface of the first quarter circular part 25Q1 extends along the circumference of a circle having a radius r1 and centered on the center C1, the inner peripheral surface of the second quarter circular part 25Q2 extends along the circumference of a circle having a radius r2 and centered on the center C2, the inner peripheral surface of the third quarter circular part 25Q3 extends along the circumference of a circle having a radius r3 and centered on the center C3 and the inner peripheral surface of the fourth quarter circular part 25Q4 extends along the circumference of a circle having a radius r4 and centered on the center C4. The length L1 may be equal to the length L2. The length W1 may be equal to the length W2. The lengths L1, L2, W1 and W2 may be equal to each other. The radii r1, r2, r3 and r4 may be equal to each other.

In one embodiment of the present invention, the ratio of the radius r1 to the thickness T1 (i.e., r1/T1, hereinafter referred to as the "radius-to-thickness ratio") is from 1 to 3. If the radius-to-thickness ratio is less than 1, the insulating coating film 27 on the surface of the coil part 25 is more likely to peel off. Accordingly, the lower limit of the radius-to-thickness ratio is set to 1. On the other hand, the radius-to-thickness ratio is desirably equal to or less than 3 in order to allow the inner peripheral surface a11 of the first turn part a1 and the inner peripheral surfaces of the other turn parts to protrude inwardly in the radial direction and allow the outer peripheral surface a12 of the first turn part a1 and the outer peripheral surface of the other turn parts to be depressed inwardly in the radial direction, as will be described below. For the reasons stated above, in one embodiment of the invention, the radius-to-thickness ratio is within the range of 1 to 3.

In one embodiment of the present invention, the sum of the length of the inner peripheral surface of the first quarter circular part 25Q1 around the center C1, the length of the inner peripheral surface of the second quarter circular part 25Q2 around the center C2, the length of the inner peripheral surface of the third quarter circular part 25Q3 around the center C3, and the length of the inner peripheral surface of the fourth quarter circular part 25Q4 around the center C4 (i.e., $(\pi \cdot r1+\pi \cdot r2+\pi \cdot r3+\pi \cdot r4)/2$) is equal to or greater than the sum of the lengths of the first to fourth straight parts 25L1 to 25L4 (i.e., L1+L2+W1+W2).

In one embodiment, the thickness T1 of the first turn part a1 is 0.5 mm, the radii r1 to r4 are all 0.5 mm, the lengths L1 and L2 are both 0.8 mm, and the lengths W1 and W2 are both 0.7 mm.

Figure 13:
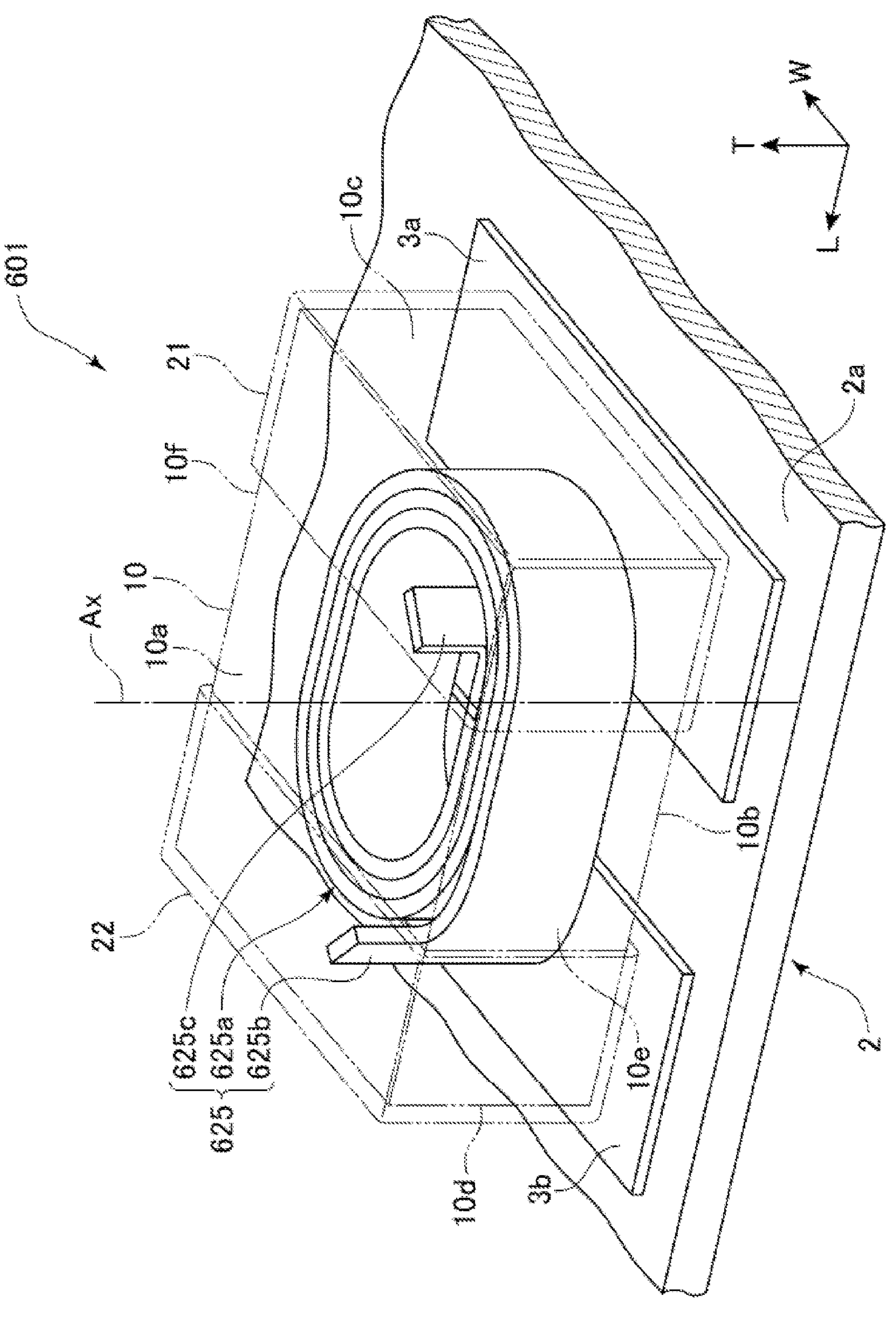
FIG. 13 is a perspective view schematically showing a coil component according to another embodiment of the present invention.

The following describes a coil component 601 according to another embodiment of the invention with reference to FIG. 13. FIG. 13 is a schematic perspective view showing the coil component 601. The coil component 601 is different from the coil component 1 in that it includes a coil part 625 instead of the coil part 25. The following description thus mainly discuss the coil part 625. The coil part 625 has a winding part 625*a* wound around the coil axis Ax a plurality of turns, a lead-out part 625*b* connected to one of the ends of the winding part 625*a* and extending along the T-axis to the top surface 10*a* of the base body 10, and a lead-out part 625*c* connected to the other end of the winding part 625*a* and extending along the T axis to the top surface 10*a* of the base body 10. In the embodiment shown, the winding part 625*a* is wound around the coil axis Ax approximately 3 turns. Like the first to third turn parts a1 to a3 of the coil component 1, the parts making the turns of the winding part 625*a* are aligned next to each other in the radial direction from the inside to the outside on a winding plane orthogonal to the coil axis Ax. The coil component 601 can be manufactured using, for example, a spindle-type winding machine and known techniques.

Advantageous effects of the embodiments will be now described. In the coil components relating to one or more embodiments of the present invention, the first outer peripheral surface a12 of the first turn part a1 is depressed toward the coil axis Ax, and the inner peripheral surface a21 of the second turn part a2 protrudes toward the coil axis Ax. This enables the inner peripheral surface a21 of the second turn part a2 to engage with the first outer peripheral surface a12 of the first turn part a1, so that the first and second turn parts a1 and a2 can restrict each other from moving in the axial direction. This can prevent the first and second turn parts a1 and a2 from moving in the axial direction out of the predetermined aligned position on, for example, the winding plane B1. The same mechanism also works for the other turn parts, so that the other turn parts can be also restricted from moving in the axial direction out of the predetermined aligned position on the winding plane B1 or B2.

According to one or more embodiments of the present invention, the distance d1 in the radial direction between the outer-peripheral-surface closest portion a12P1 of the first turn part 1*a* and the outer-peripheral-surface most distant portion a12P2 of the first turn part 1*a* is greater than the thickness t1 of the insulating coating film 27 on the surface of the coil part 25. This allows the outer-peripheral-surface most distant portion a12P2 of the first turn part 1*a* to support the second turn part 2*a*, thereby preventing the second turn part 2*a* from moving in the axial direction. This can prevent the second turn part a2 from moving in the axial direction out of the aligned position. The same mechanism also works for the other turn parts, so that the other turn parts can be also restricted from moving in the axial direction out of the aligned position.

According to one or more embodiments of the present invention, the inner-peripheral-surface closest portion a21P1 of the second turn part 1*b* is positioned, in the radial direction, closer to the coil axis Ax than is the outer-peripheral-surface most distant portion a12P2 of the first turn part a1. This allows the outer-peripheral-surface most distant portion a12P2 of the first turn part 1*a* to support the inner-peripheral-surface closest portion a21P1 of the second turn part 1*b*, thereby more reliably preventing the second turn part 2*a* from moving in the axial direction.

The dimensions, materials, and arrangements of the constituent elements described for the above various embodiments are not limited to those explicitly described for the embodiments, and these constituent elements can be modified to have any dimensions, materials, and arrangements within the scope of the present invention.

Furthermore, constituent elements not explicitly described herein can also be added to the above-described embodiments, and it is also possible to omit some of the constituent elements described for the embodiments.

The words "first," "second," and "third" used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituents from performing the functions of the constituent identified by other numbers.

What is claimed is:

1. A coil component comprising:

a magnetic base body; and a coil part provided in the magnetic base body, the coil part including (i) a first turn part extending around a coil axis that runs in an axial direction, (ii) a second turn part positioned outside the first turn part in a radial direction that is orthogonal to the axial direction and is centered on the coil axis, and (iii) an insulating coating film covering a surface of the coil part; wherein the first turn part has: a first inner peripheral surface; and a first outer peripheral surface facing the first inner peripheral surface and depressed inwardly in the radial direction when seen in a section of the coil component obtained by cutting the coil component along a plane passing through the coil axis, and wherein the second turn part has: a second inner peripheral surface facing the first outer peripheral surface and protruding inwardly in the radial direction when seen in the section; and a second outer peripheral surface facing the second inner peripheral surface.

2. The coil component of claim 1, wherein the first inner peripheral surface protrudes inwardly in the radial direction.

3. The coil component of claim 1, wherein the second outer peripheral surface is depressed inwardly in the radial direction.

4. The coil component of claim 1, wherein, when seen in the section, a depth of the first outer peripheral surface that represents a distance in the radial direction between (i) a first-outer-peripheral-surface closest portion of the first outer peripheral surface that is the closest to the coil axis and (ii)

a first-outer-peripheral-surface most distant portion of the first outer peripheral surface that is the most distant from the coil axis is greater than a thickness of the insulating coating film.

5. The coil component of claim 4, wherein a second-inner-peripheral-surface closest portion of the second inner peripheral surface that is the closest to the coil axis is located closer to the coil axis in the radial direction than is the first-outer-peripheral-surface most distant portion.

6. The coil component of claim 4, wherein a depth of the second outer peripheral surface that represents a distance in the radial direction between (i) a second-outer-peripheral-surface closest portion of the second outer peripheral surface that is the closest to the coil axis and (ii) a second-outer-peripheral-surface most distant portion of the second outer peripheral surface that is the most distant from the coil axis is greater than the thickness of the insulating coating film.

7. The coil component of claim 1, comprising:

a first external electrode connected to one of ends of the coil part; and a second external electrode connected to the other of the ends of the coil part.

8. The coil component of claim 1, wherein the coil part includes:

a first winding part including the first and second turn parts;

a second winding part differently positioned in the axial direction than the first winding part; and a connecting part connecting together the first and second winding parts.

9. The coil component of claim 8, wherein the second winding part includes a third turn part and a fourth turn part positioned outside the third turn part in the radial direction, wherein the third turn part has:

a third inner peripheral surface; and a third outer peripheral surface facing the third inner peripheral surface and depressed inwardly in the radial direction when seen in the section, and wherein the fourth turn part has:

a fourth inner peripheral surface facing the third outer peripheral surface and protruding inwardly in the radial direction when seen in the section; and a fourth outer peripheral surface facing the fourth inner peripheral surface.

10. The coil component of claim 9, wherein the third inner peripheral surface protrudes inwardly in the radial direction.

11. The coil component of claim 9, wherein the fourth outer peripheral surface is depressed inwardly in the radial direction.

12. The coil component of claim 9, wherein a depth of the third outer peripheral surface that represents a distance in the radial direction between (i) a third-outer-peripheral-surface closest portion of the third outer peripheral surface that is the closest to the coil axis and (ii) a third-outer-peripheral-surface most distant portion of the third outer peripheral surface that is the most distant from the coil axis is greater than a thickness of the insulating coating film.

13. The coil component of claim 9, wherein the first turn part has a curved first connecting surface connecting together the first inner and outer peripheral surfaces, wherein the second turn part has a curved second connecting surface connecting together the second inner and outer peripheral surfaces, wherein the third turn part has a curved third connecting surface facing the first connecting surface and connecting together the third inner and outer peripheral surfaces, and wherein the fourth turn part has a curved fourth connecting surface facing the second connecting surface and connecting together the fourth inner and outer peripheral surfaces.

14. The coil component of claim 9, wherein, when seen in the section, a normal at a center in the axial direction of the first inner peripheral surface and a normal at a center in the axial direction of the third inner peripheral surface are both parallel to the coil axis.

15. The coil component of claim 9, wherein, when seen in the section, a first angle made between the coil axis and a line segment extending along a normal at a center in the axial direction of the first inner peripheral surface from the first inner peripheral surface to the coil axis is different from a second angle made between the coil axis and a line segment extending along a normal at a center in the axial direction of the third inner peripheral surface from the third inner peripheral surface to the coil axis.

16. The coil component of claim 9, wherein, when seen in the section, a first angle made between the coil axis and a line segment extending along a normal at a center in the axial direction of the first inner peripheral surface from the first inner peripheral surface to the coil axis is equal to a second angle made between the coil axis and a line segment extending along a normal at a center in the axial direction of the third inner peripheral surface from the third inner peripheral surface to the coil axis.

17. The coil component of claim 9, wherein, when seen in the section, a first aspect ratio representing a ratio of a dimension of the first turn part in the axial direction to a dimension of the first turn part in the radial direction is in a range of 0.5 to 2.0, wherein, when seen in the section, a second aspect ratio representing a ratio of a dimension of the second turn part in the axial direction to a dimension of the second turn part in the radial direction is in a range of 0.5 to 2.0, wherein, when seen in the section, a third aspect ratio representing a ratio of a dimension of the third turn part in the axial direction to a dimension of the third turn part in the radial direction is in a range of 0.5 to 2.0, and wherein, when seen in the section, a fourth aspect ratio representing a ratio of a dimension of the fourth turn part in the axial direction to a dimension of the fourth turn part in the radial direction is in a range of 0.5 to 2.0.

18. A circuit board comprising the coil component of claim 1.

19. An electronic device comprising the circuit board of claim 18.

* * * * *